(12) United States Patent
Saleh et al.

(10) Patent No.: US 12,535,410 B2
(45) Date of Patent: Jan. 27, 2026

(54) SYSTEMS AND METHODS FOR DETERMINING WATER CONTENT IN A SAMPLE

(71) Applicant: University of Maine System Board of Trustees, Orono, ME (US)

(72) Inventors: Sfoog H. Saleh, Old Town, ME (US); Carl P. Tripp, Orono, ME (US)

(73) Assignee: University of Maine System Board of Trustees, Orono, ME (US)

( * ) Notice: Subject to any disclaimer, the term of this patent is extended or adjusted under 35 U.S.C. 154(b) by 300 days.

(21) Appl. No.: 18/025,938

(22) PCT Filed: Sep. 13, 2021

(86) PCT No.: PCT/US2021/050000
§ 371 (c)(1),
(2) Date: Mar. 13, 2023

(87) PCT Pub. No.: WO2022/056351
PCT Pub. Date: Mar. 17, 2022

(65) Prior Publication Data
US 2023/0366814 A1    Nov. 16, 2023

Related U.S. Application Data

(60) Provisional application No. 63/078,209, filed on Sep. 14, 2020.

(51) Int. Cl.
*G01N 21/3554* (2014.01)
*G01N 21/65* (2006.01)
*G01N 33/28* (2006.01)

(52) U.S. Cl.
CPC ......... *G01N 21/3554* (2013.01); *G01N 21/65* (2013.01); *G01N 33/2847* (2013.01)

(58) Field of Classification Search
CPC .............. G01N 21/3554; G01N 21/65; G01N 33/2847; G01N 1/405; G01N 21/33;
(Continued)

(56) References Cited

U.S. PATENT DOCUMENTS 4,581,930 A * 4/1986 Komons ................. G01F 1/696
73/204.22
5,071,768 A   12/1991 Klodowski
(Continued)

FOREIGN PATENT DOCUMENTS

CN        207165258 U    3/2018
CN        210053192 U    2/2020
(Continued)

OTHER PUBLICATIONS

Basnayake, et al., Hydration and Interfacial Water in Nation Membrane Probed by Transmission Infrared Spectroscopy, The Journal of Physical Chemistry B, 110(4): 23938-239437 (2006).
(Continued)

*Primary Examiner* — Francis C Gray
(74) *Attorney, Agent, or Firm* — Choate, Hall & Stewart LLP; Brian E. Reese; Meaghan E. Bychowski

(57) ABSTRACT

Methods, kits, and systems for determining water content of a sample are described herein. In some embodiments, methods of the present disclosure are directed to measuring water concentration in oil samples.

22 Claims, 16 Drawing Sheets

(58) Field of Classification Search
CPC .............. G01N 2021/3155; G01N 2021/3595; G01N 21/31; G01N 22/00
See application file for complete search history.

(56) References Cited

U.S. PATENT DOCUMENTS

| | | | |
|---|---|---|---|
| 5,107,118 | A | 4/1992 | Murray, Jr. et al. |
| 5,206,615 | A | 4/1993 | Fujita et al. |
| 5,442,968 | A * | 8/1995 | Westlake, III ..... G01N 30/6047 210/321.74 |
| 7,407,625 | B1 | 8/2008 | Scott |
| 7,419,831 | B2 * | 9/2008 | Frawley ................. G01N 30/14 436/39 |
| 8,100,005 | B2 | 1/2012 | Fane et al. |
| 8,556,089 | B2 | 10/2013 | Kalayci et al. |
| 9,014,991 | B2 | 4/2015 | van de Voort et al. |
| 10,031,136 | B2 | 7/2018 | Roy et al. |
| 10,562,787 | B2 * | 2/2020 | Hoek ..................... B01D 61/12 |
| 2006/0175208 | A1 | 8/2006 | Eickhoff et al. |
| 2014/0176936 | A1 | 6/2014 | Van Mechelen et al. |
| 2017/0044055 | A1 | 2/2017 | Keite-Telgenbüscher et al. |

FOREIGN PATENT DOCUMENTS

| | | |
|---|---|---|
| WO | WO-2014/090309 A1 | 6/2014 |
| WO | WO-2020/007509 A1 | 1/2020 |
| WO | WO-2022/056351 A1 | 3/2022 |

OTHER PUBLICATIONS

International Search Report for PCT/US21/50000, 4 pages (mailed Feb. 7, 2022).

Written Opinion for PCT/US21/50000, 8 pages (mailed Feb. 7, 2022).

* cited by examiner

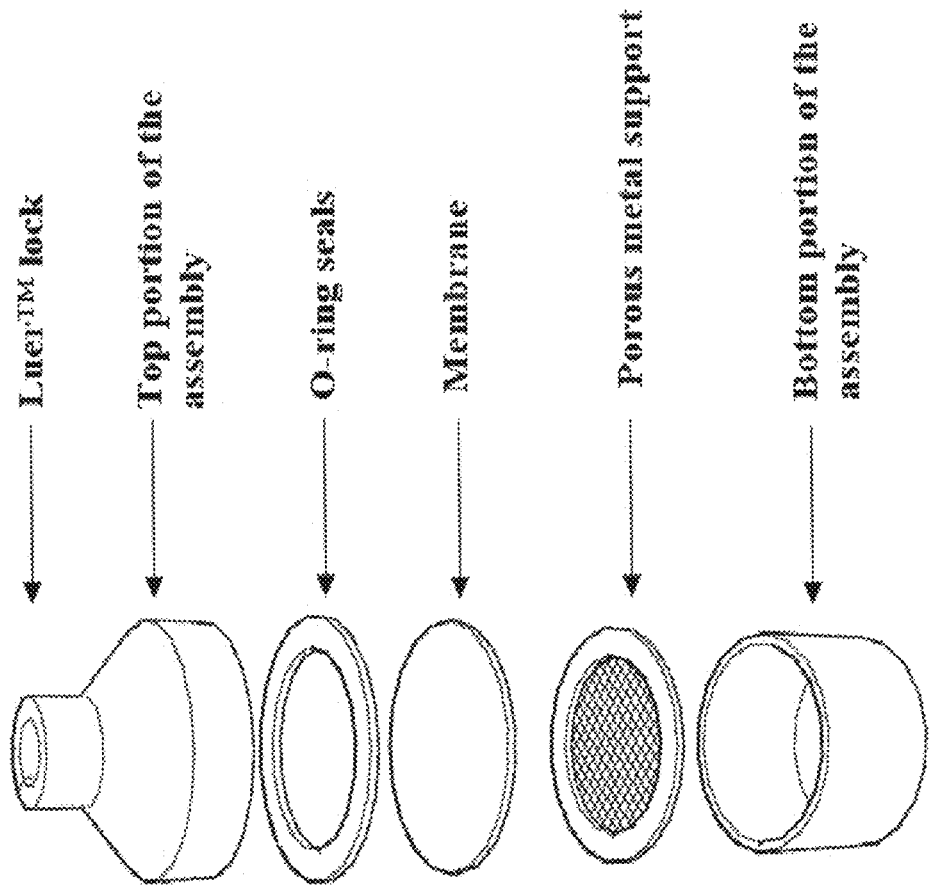
Figure 1A
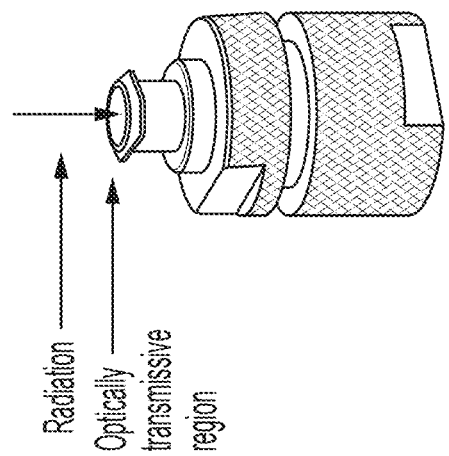

SYSTEMS AND METHODS FOR DETERMINING WATER CONTENT IN A SAMPLE

CROSS REFERENCE TO RELATED APPLICATIONS

This application claims priority to and the benefit of U.S. Provisional Patent Application No. 63/078,209, filed Sep. 14, 2020, the entirety of which is incorporated herein by reference.

BACKGROUND

Water is the principle contaminant in all types of oils and often leads to undesired properties. For example, the presence of water in lubricants leads to oil degradation and to the corrosion and wear of metal components. The gold standard method for measuring water concentration in oils is Karl Fischer titration. This method provides a wide range detection of water from 1 ppm to 100% water.

SUMMARY

In one aspect, the present disclosure is directed to methods of measuring water concentration in a sample including steps of passing a sample through a membrane that is transparent to one or more forms of radiation in at least one region of interest, irradiating the membrane with the one or more forms of radiation, and determining water concentration in the sample from one or more absorbance and/or Raman peaks.

In some embodiments, one or more forms of radiation applied to a sample in a method described herein includes microwave, infrared, visible, and/or ultraviolet light.

In some embodiments, one or more forms of radiation applied to a sample in a method described herein includes infrared light.

In some embodiments, a determining step of a method provided herein includes a step of measuring reflected, transmitted, emitted and/or scattered light.

In some embodiments, in a method described herein, a membrane is cooled and/or purged with a gas that is substantially free of water prior to a step of passing a sample through the membrane.

In some embodiments, in a method described herein, a membrane is cooled under vacuum prior to the step of passing a sample through the membrane.

In some embodiments, in a method described herein, a membrane is cooled for at least a portion of the passing, irradiating, and determining steps of the method.

In some embodiments, in a method described herein, a membrane is cooled to a temperature between −196° C. to 10° C., inclusive.

In some embodiments, one or more absorbance and/or Raman peaks measured in a method described herein are characterized in that they occur at a wavelength selected from the group consisting of about 5185 cm$^{-1}$, about 3420 cm$^{-1}$, about 2127 cm$^{-1}$, about 1650 cm$^{-1}$, about 800 cm$^{-1}$ and combinations thereof.

In some embodiments, water concentration in a sample analyzed by a method described herein is in a range of about 1 ppm to about 10,000 ppm.

In some embodiments, water concentration in a sample analyzed by a method described herein is in a range of about 1 ppm to about 1,000 ppm.

In some embodiments, water concentration in a sample analyzed by a method described herein is in a range of about 1,000 ppm to about 10,000 ppm.

In some embodiments, one or more absorbance and/or Raman peaks measured in a method described herein are characterized by a wavelength of about 3420 cm$^{-1}$.

In some embodiments, one or more absorbance and/or Raman peaks measured in a method described herein are characterized by a wavelength of about 2127 cm$^{-1}$.

In another aspect, the present disclosure is directed to methods of measuring water concentration in a sample including steps of adding an agent to a sample to react with and/or adsorb water from the sample, thereby forming a solid particulate material, collecting the solid particulate material on a membrane that is transparent to one or more forms of radiation in at least one region of interest, irradiating the membrane with the one or more forms of radiation, and determining water concentration in the sample from one or more absorbance and/or Raman peaks.

In some embodiments, in a method described herein, one or more forms of radiation includes microwave, infrared, visible, or ultraviolet light.

In some embodiments, in a method described herein, one or more forms of radiation includes infrared light.

In some embodiments, a determining step of a method described herein includes a step of measuring reflected, transmitted, emitted or scattered light.

In some embodiments, in a method described herein, a step of adding an agent to a sample includes adding a membrane coated in an agent to the sample.

In some embodiments, an agent added to a sample in a method described herein is selected from the group consisting of calcium oxide, magnesium oxide, copper sulfate, zinc oxide, sodium oxide, iron chloride, cobalt nitrate, nickel sulfate, tungsten oxide, alumina, silica, titania, calcium hydride, and combinations thereof.

In some embodiments, an agent added to a sample in a method described herein is calcium oxide.

In some embodiments, where calcium oxide is added as an agent to a sample in a method described herein, the calcium oxide reacts with water to form Ca(OH)$_2$.

In some embodiments, where calcium oxide is added as an agent to a sample in a method described herein, one or more absorbance and/or Raman peaks measured are characterized by a wavelength of about 3645 cm$^{-1}$.

In some embodiments, an agent added to a sample in a method described herein is copper sulfate.

In some embodiments, where copper sulfate is added as an agent to a sample in a method described herein, the copper sulfate adsorbs water to form a hydrate.

In some embodiments, where copper sulfate is added as an agent to a sample in a method described herein, one or more absorbance and/or Raman peaks measured are characterized by a wavelength in a range of about 3500 cm$^{-1}$ to about 3100 cm$^{-1}$, in a range of about 1600 cm$^{-1}$ to about 1800 cm$^{-1}$, or combinations thereof.

In some such embodiments, one or more absorbance and/or Raman peaks measured in a method described herein are characterized by a wavelength of about 3420 cm$^{-1}$, 3190 cm$^{-1}$, 1743 cm$^{-1}$, 1667 cm$^{-1}$, or combinations thereof.

In some embodiments, where copper sulfate is added to a sample as the agent in a method described herein, and the copper sulfate adsorbs water to form a hydrate, the hydrate comprises copper sulfate monohydrate.

In some embodiments, where copper sulfate is added to a sample as the agent in a method described herein, and the copper sulfate adsorbs water to form a hydrate, one or more absorbance and/or Raman peaks measured are characterized by a wavelength of about 3190 cm$^{-1}$, about 1743 cm$^{-1}$, or combinations thereof.

In some such embodiments, where copper sulfate is added to a sample as the agent in a method described herein, and the copper sulfate adsorbs water to form a hydrate, one or more absorbance and/or Raman peaks measured are characterized by a wavelength of about 1743 cm$^{-1}$.

In some embodiments, in a method described herein, water concentration in a sample is in a range of about 1 ppm to about 10,000 ppm.

In some embodiments, in a method described herein, an amount of an agent is added to a sample such that absence of an absorbance peak at 3420 cm$^{-1}$ indicates complete consumption of water in a sample.

In some embodiments, in a method described herein, a sample is an oil.

In some embodiments, in a method described herein, a membrane is at least partially coated in oil.

In some embodiments, in a method described herein, an oil that is at least partially coating a membrane is a secondary oil.

In some embodiments, in a method described herein, a membrane has a diameter of 1 to 80 mm.

In some such embodiments, a membrane has a diameter of 10 to 50 mm.

In some embodiments, one or more absorbance and/or Raman peaks measured in a method described herein are measured with a Fourier Transform Infrared Spectrometer (FTIR), a dispersive infrared both single and double beam, a filtermetric spectrometer, a tunable laser based infrared spectrometer, or a Raman spectrometer.

In another aspect, the present disclosure is directed to kits for measuring water concentration in a sample including one or more doses of an agent and a membrane assembly containing a membrane.

In some embodiments, an agent of a kit is selected from calcium oxide, magnesium oxide, copper sulfate, zinc oxide, sodium oxide, iron chloride, cobalt nitrate, nickel sulfate, tungsten oxide, alumina, silica, titania, calcium hydride, and combinations thereof.

In some embodiments, one or more doses of an agent in a kit described herein are provided in the form of a vial, bottle, or capsule.

In another aspect of the present disclosure, a system for measuring water concentration in a sample includes a membrane that is transparent to one or more forms of radiation in at least one region of interest, an enclosure that removably retains the membrane and includes an optically transmissive region through which radiation may pass, and an inlet for the enclosure.

In some embodiments, a system described herein further includes a pump.

In some such embodiments, a pump is capable of one or more of creating a vacuum, and introducing a gas that is substantially free of water into and/or through at least a portion of the enclosure.

In some embodiments, a system described herein further includes a cooling means.

In some such embodiments, a cooling means is or includes a metal holder surrounded by a reservoir containing a cooling fluid and/or a cooling means is or includes an external chiller that cools a fluid, which is circulated through a jacket surrounding a membrane assembly.

In some embodiments, a system further includes a porous support for a membrane.

In some embodiments, an inlet of a system described herein includes a connector.

In some embodiments, a system described herein further includes one or more seals.

BRIEF DESCRIPTION OF THE DRAWING

The drawing is presented in the present disclosure for illustration purposes, without the intention of limiting the scope of the subject matter described in the present disclosure.

The foregoing and other objects, aspects, features, and advantages of the present disclosure will become more apparent and better understood by referring to the following description taken in conjunction with the accompanying drawing, in which:

FIG. 1A, and FIG. 1B depict exemplary pictures and schematics of a stainless-steel membrane assembly in accordance with one or more embodiments of the present disclosure;

DEFINITIONS

Figure 1B:
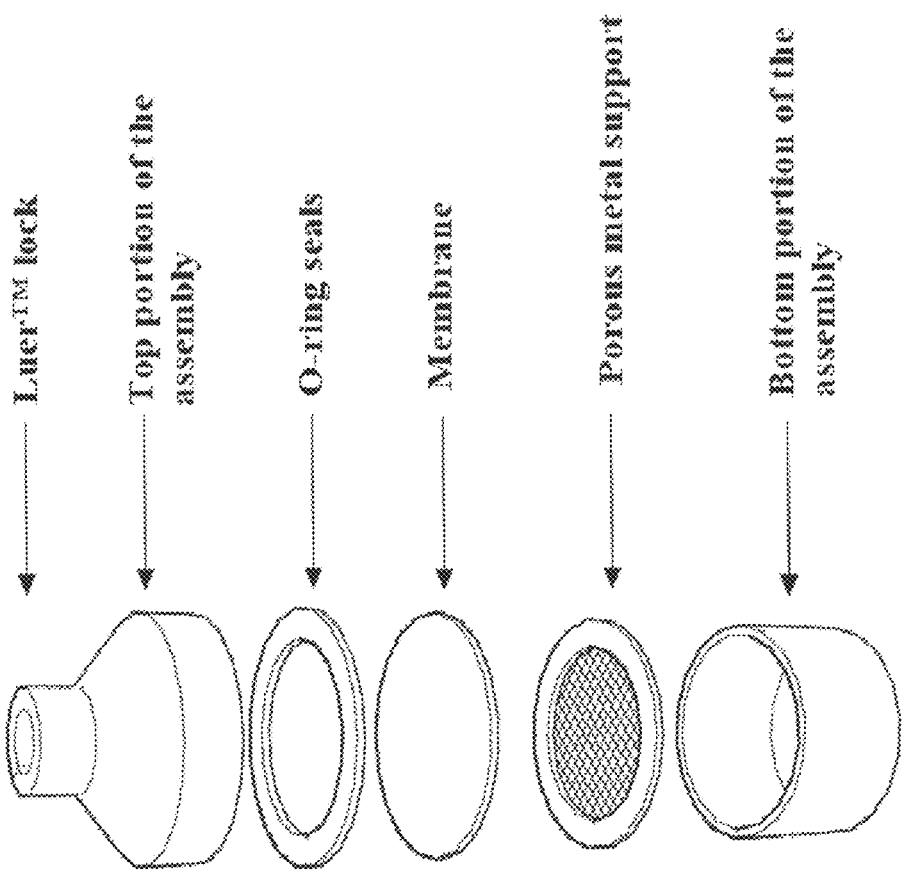

Throughout the specification, several terms are employed that are defined in the following paragraphs. Other definitions may also be found within the body of the specification.

In this application, unless otherwise clear from context, the term "a" may be understood to mean "at least one." As used in this application, the term "or" may be understood to mean "and/or." In this application, the terms "comprising" and "including" may be understood to encompass itemized components or steps whether presented by themselves or together with one or more additional components or steps. As used in this application, the term "comprise" and variations of the term, such as "comprising" and "comprises," are not intended to exclude other additives, components, integers or steps.

About, Approximately: As used herein, the terms "about" and "approximately" are used as equivalents. Unless otherwise stated, the terms "about" and "approximately" may be understood to permit standard variation as would be understood by those of ordinary skill in the art. Where ranges are provided herein, endpoints are included. Any numerals used in this application with or without about/approximately are meant to cover any normal fluctuations appreciated by one of ordinary skill in the relevant art. In some embodiments, the term "approximately" or "about" refers to a range of values that fall within 25%, 20%, 19%, 18%, 17%, 16%, 15%, 14%, 13%, 12%, 11%, 10%, 9%, 8%, 7%, 6%, 5%, 4%, 3%, 2%, 1%, or less in either direction (greater than or less than) of the stated reference value unless otherwise stated or otherwise evident from the context (except where such number would exceed 100% of a possible value).

Determine: Many methodologies described herein include a step of "determining". Those of ordinary skill in the art, reading the present specification, will appreciate that such "determining" can utilize or be accomplished through use of any of a variety of techniques available to those skilled in the art, including for example specific techniques explicitly referred to herein. In some embodiments, determining involves manipulation of a physical sample. In some embodiments, determining involves consideration and/or manipulation of data or information, for example utilizing a computer or other processing unit adapted to perform a relevant analysis. In some embodiments, determining involves receiving relevant information and/or materials from a source. In some embodiments, determining involves comparing one or more features of a sample or entity to a comparable reference.

Substantially: As used herein, the term "substantially" refers to the qualitative condition of exhibiting total or near-total extent or degree of a characteristic or property of interest. One of ordinary skill in the biological and/or chemical arts will understand that biological and chemical phenomena rarely, if ever, go to completion and/or proceed to completeness or achieve or avoid an absolute result. The term "substantially" is therefore used herein to capture the potential lack of completeness inherent in many biological and chemical phenomena.

DETAILED DESCRIPTION

It is contemplated that systems, devices, methods, and processes of the present application encompass variations and adaptations developed using information from embodiments described in the following description. Adaptation and/or modification of compositions, methods, and processes described in the following description may be performed by those of ordinary skill in the relevant art.

Throughout the description, where compositions, compounds, or products are described as having, including, or comprising specific components, or where processes and methods are described as having, including, or comprising specific steps, it is contemplated that, additionally, there are articles, devices, and systems of the present application that consist essentially of, or consist of, recited components, and that there are processes and methods according to the present application that consist essentially of, or consist of, recited processing steps.

It should be understood that order of steps or order for performing certain actions is immaterial so long as a described method remains operable. Moreover, two or more steps or actions may be conducted simultaneously.

Reference in the present application to any publication, for example, in the Background section, is not an admission that the publication serves as prior art with respect to any of the presented claims. The Background section is presented for purposes of clarity and is not meant as a description of prior art with respect to any claim. Headers are provided for the convenience of the reader and are not intended to be limiting with respect to claimed subject matter.

While Karl Fischer titration (KFT) represents the gold standard of measuring water concentration in oil, its requirement for expensive and hazardous reagents creates a need for less expensive and less potentially toxic methods for achieving accurate and rapid determination of water levels in oil-containing samples.

One known alternative method is based on the use of infrared (IR) spectroscopy. The standard method described in ASTM E2412 is straightforward, rapid, and involves no chemical additives. An oil sample is injected into a cell with a fixed path length of 0.08 mm to 0.120 mm, after which an absorbance spectrum is acquired in transmission mode. Water is quantified from the intensity of the broad OH band of water near 3400 $cm^{-1}$. While simple in principle, there are several challenges associated with this approach. Interactions of water with oil additives or with the oil itself alters the intensity and position of the water bands in an IR spectrum; consequently, calibration is required for each matrix. In addition, water often exists as droplets dispersed in the oil, which causes scattering of infrared radiation. In some oils, such scattering is so severe that no water band at 3400 $cm^{-1}$ is observed.

Various previously attempted approaches proposed to overcome these challenges include the use of surfactants to stabilize water droplet size, extraction with dry solvents, and by addition of a reagent that reacts with the water in the oil, followed by quantification of the products formed by IR spectroscopy. Use of a surfactant leads to increased precision of the measurement; however, calibration is required as droplet size is dependent on experimental conditions and sample matrix. Extraction with dry solvents, such as acetonitrile, dimethyl sulfoxide, dichloromethane, diethyl ether, N,N-dimethylformamide, tetrahydrofuran, and propylene carbonate, similarly requires calibration to account for extraction efficiencies. Furthermore, water can interact with other components in the oil that are also extracted with the solvent. In the case of reactants, dimethoxypropane and toluenesulfonyl isocyanate react with water dispersed in oil to produce acetone and carbon dioxide, respectively. The products formed are detected by monitoring the C═O stretching modes in the IR spectrum. In this regard, the C═O band for carbon dioxide has the advantage of appearing in a region of the infrared spectrum where most oils are transparent.

In contrast to the above attempts, the present disclosure describes novel, improved approaches to measuring water in oils. In one approach, water existing in a sample as dissolved water or emulsified water droplets is extracted using a membrane that is transparent to one or more form(s) of radiation in at least one region of interest. In accordance with various embodiments, water may form an adsorbed layer on the membrane and produces a typical spectrum of water. In general, no calibration or additional reagents are required for this approach. In some embodiments, this approach may be used over a detection range of 1 to 5000 ppm of water. In another approach, one or more reagents that react with and/or adsorb water is added to a sample. When a known volume of sample is passed through a membrane that is transparent to one or more forms of radiation in at least one region of interest, a reaction and/or adsorption product is collected and quantified to determine water concentration of the sample. In accordance with various embodiments, a region of interest includes a range of wavelengths at which water and/or a reaction and/or adsorption product of water absorb radiation.

I. Methods

In some embodiments, the present disclosure is directed to membrane-based methods of measuring water concentration in a sample. In some embodiments, a sample is processed through a membrane that is transparent to one or more forms of radiation in at least one region of interest, the membrane is irradiated with the one or more forms of radiation, and the water concentration in the sample is determined from one or more absorbance and/or Raman peaks.

A. Samples i. Composition of Sample

In some embodiments, a sample is a hydrophobic sample. For example, in some embodiments a sample is or comprises an oil or a solvent. In some embodiments, a sample is or comprises an oil. In some embodiments, an oil is selected from the group consisting of a lubricating oil, vegetable oil, animal-based oil, hydraulic oil, petroleum-based oil, heavy gas (e.g. sulfur hexafluoride), synthetic oil, oil additive, biofuel, waste oil (e.g. waste oil regulated under the Resource Conservation and Recovery Act (RCRA)), and combination thereof. In some embodiments, an oil is or comprises a power steering fluid. In some embodiment, an oil is or comprises a vegetable oil (e.g. Olive and Soya bean oil). In some embodiments, an oil is or comprises an animal-based oil (e.g., fish oil). In some embodiments, an oil is or comprises an extreme pressure oil (e.g. gear oil). In some embodiments, an oil is or comprises a petroleum-based oil. In some embodiments, an oil is or comprises a mixture of a petroleum-based oil and a synthetic oil (e.g., an aviation fuel). In some embodiments, a petroleum-based oil is or comprises an oil selected from the group consisting of crude oil, gasoline, kerosene, diesel oil, aviation fuel, racing fuel, and vacuum residue fuel (VR fuel, e.g., the heaviest fraction of oil produced during the distillation of crude oils). In some embodiments, an oil is or comprises crude oil. In some embodiment, an oil is or comprises gasoline. In some embodiments, an oil is or comprises kerosene. In some embodiments, an oil is or comprises diesel oil. In some embodiments, an oil is or comprises racing fuel (e.g. VP racing fuel). In some embodiments, an oil is or comprises VR fuel. In some embodiments, an oil is or comprises heavy gas. In some embodiments, heavy gas is or comprises sulfur hexafluoride. In some embodiments, an oil is or comprises synthetic oil. In some embodiments, an oil is or comprises an oil additive. In some embodiments, an oil is or comprises biofuel. In some embodiment, an oil is or comprises waste oil (e.g. RCRA waste oil).

In some embodiments, a sample is or comprises a solvent. In some embodiments, a solvent is or comprises a non-aqueous solvent. In some embodiments, a solvent is or comprises an organic solvent. In some embodiments, an organic solvent is selected from the group consisting of an alcohol, a hydrocarbon, a halogenated solvent, a ketone, an ether, a glycol, a nitrogen-containing solvent, a sulfur-containing solvent, a furyl solvent, an aromatic solvent, a silane liquid, an ionic liquid, and combinations thereof. In some embodiments, an alcohol is selected from the group consisting of methanol, ethanol, propanol, isopropanol, butanol, and the like. In some embodiments, a hydrocarbon is selected from the group consisting of pentane, hexane, heptane, octane, and the like. In some embodiments, a halogenated solvent is a chlorinated solvent. In some embodiments, a chlorinated solvent is selected from the group consisting of chloroform, dichloromethane, dichloroethane, and the like. In some embodiments, a ketone is selected from the group consisting of acetone, methyl ethyl ketone, methyl isobutyl ketone, diisobutyl ketone, cyclohexanone, and the like. In some embodiments, an ether is selected from the group consisting of diethyl ether, methyl tert-butyl ether, tetrahydrofuran, dioxane, and the like. In some embodiments, a glycol is selected from the group consisting of ethylene glycol, propylene glycol, and the like. In some embodiments, a nitrogen-containing solvent is selected from the group consisting of pyridine, triethylamine, imidazole, acetonitrile, urea, and the like. In some embodiments, a sulfur-containing solvent is selected from the group consisting of dimethyl sulfoxide and the like. In some embodiments, a furyl solvent is selected from furfural and the like. In some embodiments, an aromatic solvent is selected from the group consisting of benzene, toluene, xylene, and the like. In some embodiments a silane liquid is selected from the group consisting of alkyltrimethoysilane, alkyltrichlorosilane, and polydimethylsilicone oil. In some embodiments, an ionic liquid is selected from the group consisting of 1-ethyl-3-methylimidazolium, ethylammonium nitrate and 1-alkylpyridinium.

ii. Concentration Range of Water in Sample

In some embodiments, water concentration in a sample is in the range of about 1 ppm to about 10,000 ppm. In some embodiments, water concentration in a sample is in the range of about 1 ppm to about 5,000 ppm. In some embodiments, water concentration in a sample is in the range of about 1 ppm to about 1,000 ppm. In some embodiments, water concentration in a sample is in the range of about 1 ppm to about 500 ppm. In some embodiments, water concentration in a sample is in the range of about 1 ppm to about 100 ppm. In some embodiments, water concentration in a sample is in the range of about 1 ppm to about 10 ppm. In some embodiments, water concentration in a sample is in the range of about 10 ppm to about 5,000 ppm. In some embodiments, water concentration in a sample is in the range of about 10 ppm to about 1,000 ppm. In some embodiments, water concentration in a sample is in the range of about 10 ppm to about 500 ppm. In some embodiments, water concentration in a sample is in the range of about 10 ppm to about 100 ppm. In some embodiments, water concentration in a sample is in the range of about 100 ppm to about 5,000 ppm. In some embodiments, water concentration in a sample is in the range of about 100 ppm to about 1,000 ppm. In some embodiments, water concentration in a sample is in the range of about 1,000 ppm to about 10,000 ppm. In some embodiments, water concentration in a sample is in the range of about 1,000 ppm to about 5,000 ppm. In some embodiments, water concentration in a sample is in the range of about 5,000 ppm to about 10,000 ppm.

B. Membranes and Membrane Assemblies

In some embodiments, a membrane is transparent to one or more forms of radiation in at least one region of interest. In some embodiments, a membrane is transparent to one or more forms of radiation in at least one region of interest, wherein the one or more forms of radiation comprises microwave, infrared, visible, and/or ultraviolet light. In some embodiments, a membrane is transparent to microwave light in at least one region of interest. In some embodiments, a membrane is transparent to infrared light in at least one region of interest. In some embodiments, a membrane is transparent to visible light in at least one region of interest. In some embodiments, a membrane is transparent to ultraviolet light in at least one region of interest.

In some embodiments, a membrane has a diameter in the range of about 1 to about 100 mm. In some embodiments, a membrane has a diameter in the range of about 1 to about 80 mm. In some embodiments, a membrane has a diameter in the range of about 1 to about 50 mm. In some embodiments, a membrane has a diameter in the range of about 1 to about 30 mm. In some embodiments, a membrane has a diameter in the range of about 5 to about 30 mm. In some embodiments, a membrane has a diameter in the range of about 10 to about 50 mm. In some embodiments, a membrane has a diameter in the range of about 10 to about 41 mm. In some embodiments, a membrane has a diameter in the range of about 10 to about 30 mm. In some embodiments, a membrane has a diameter of about 10 mm, about 11 mm, about 12 mm, about 13 mm, about 14 mm, about 15 mm, about 16 mm, about 17 mm, about 18 mm, about 19 mm, about 20 mm, about 21 mm, about 22 mm, about 23 mm, about 24 mm, about 25 mm, about 26 mm, about 27 mm, about 28 mm, about 29 mm, or about 30 mm.

In some embodiments, a membrane is characterized in terms of its void volume. In some embodiments, a volume of sample applied to a membrane is at least 10 times the void volume of said membrane. In some embodiments, a membrane has a void volume of about 1 to about 50 µL. In some embodiments, a membrane has a void volume of about 1 to about 40 µL. In some embodiments, a membrane has a void volume of about 10 to about 40 µL. In some embodiments, a membrane has a void volume of about 15 to about 35 µL. It will be appreciated by a person of skill in the art that void volume of a membrane is related to membrane diameter and thickness; for example, void volume is proportional to the square of the membrane diameter.

In some embodiments, a membrane is or comprises a metal mesh membrane. In some embodiments, a membrane is or comprises a steel mesh membrane. In some embodiments, a membrane is or comprises a glass fiber membrane. In some embodiments, a membrane is or comprises a polymer membrane. In some embodiments, a membrane is or comprises a polyethylene or a polypropylene membrane. In some embodiments, a membrane is or comprises a polytetrafluoroethylene membrane (e.g. a Teflon™ membrane). In some embodiments, a membrane is or comprises a hydrophobic polytetrafluoroethylene membrane (e.g. a hydrophobic Teflon™ membrane). In some embodiments, a membrane is or comprises a hydrophilic polytetrafluoroethylene membrane (e.g. a hydrophilic Teflon™ membrane). In some embodiments, a membrane is or comprises a metal-coated polymer membrane. In some embodiment, a membrane is coated in an agent that reacts and/or adsorbs water. Encompassed in the present disclosure is the recognition that selection of a membrane material that has a refractive index near the refractive index of a sample and/or water provides for a membrane that is particularly well suited for use in methods encompassed by the present disclosure. Without wishing to be held to a particular theory, it is contemplated that use of such membranes may be helpful in providing a membrane that is transparent to one or more form of radiation in at least one area of interest.

In accordance with various embodiments, any of a variety of application-appropriate materials may be used in or as membranes in provided methods and systems. By way of non-limiting example, some such materials are disclosed in U.S. Pat. No. 10,031,136, the entirety of which is hereby incorporated by reference.

Figure 1B:
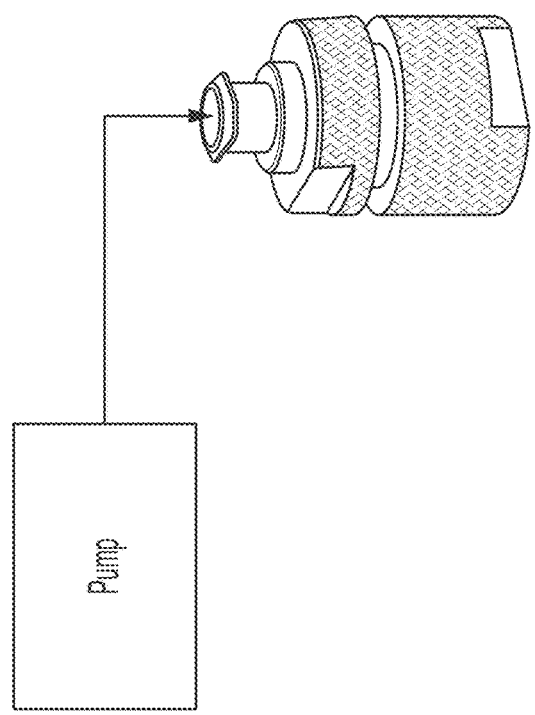

In some embodiments, a membrane may be incorporated into a membrane assembly. In some embodiments, a membrane may be removably inserted into a membrane assembly. In some embodiments, a membrane assembly comprises a membrane, a support for the membrane (e.g., a porous support), and, optionally, an enclosure with one or more inlet(s) and/or outlet(s). In some embodiments, a support for a membrane is or comprises any form of support for the membrane that provides mechanical stability to a membrane. For example, a support for a membrane prevents the membrane from tearing or falling from its position. As such, a support for a membrane provides for a membrane to be maintained in a desired position. In some embodiments, a membrane assembly further comprises one or more sealing component(s). In some embodiments, a sealing component provides a seal to a membrane assembly to prevent leakage of one or more substances (e.g. a gas or a liquid) into and/or out of a membrane assembly. In some embodiments, a sealing component is or comprises an O-ring seal. In some embodiments, a sealing component is or comprises aluminum, copper, bronze, or combinations thereof. In some embodiments, a sealing component is or comprises glue paste (e.g. Flex Paste™). In some embodiments, a sealing component is or comprises tape (e.g. Flex Tape™, Teflon™ tape). In some embodiments, the inlet of the membrane assembly is or comprises a connector (e.g. a Luer™ lock, a slip tip connector). In some embodiments, a connector allows for functional connection between components of a membrane assembly and/or functional connection of a membrane assembly to an external component. In some embodiments, a membrane assembly is or comprises metal. For example, in some embodiments, a membrane assembly comprises a metal enclosure and/or metal porous support for the membrane. In some embodiments, a membrane assembly is or comprises plastic. For example, in some embodiments, a membrane assembly comprises a plastic enclosure and/or plastic support for the membrane. In some embodiments, a membrane assembly is designed for single-use and/or is disposable. An example membrane assembly is depicted in FIG. 1.

C. Radiation

Many of the methods described herein use one or more form(s) of radiation to produce one or more absorbance and/or Raman peaks for the quantification of water in a sample. In some embodiments, a form of radiation useful in, for example, provided methods, is or comprises microwave, infrared, visible, or ultraviolet light.

i. Microwave Radiation

In some embodiments, a form of radiation useful in, for example, provided methods, is or comprises microwave light. In some embodiments, a form of radiation has a wavelength in the range of about 1 mm to about 100 cm. In some embodiments, a form of radiation is or comprises extremely high frequency microwaves. In some embodiments, a form of radiation has a wavelength in the range of about 1 mm to about 10 mm. In some embodiments, a form of radiation is or comprises super high frequency microwaves. In some embodiments, a form of radiation has a wavelength in the range of about 10 mm to about 20 cm. In some embodiments, a form of radiation has a wavelength in the range of about 1 cm to about 15 cm. In some embodiments, a form of radiation has a wavelength in the range of about 10 mm to about 10 cm. In some embodiments, a form of radiation is or comprises ultra-high frequency microwaves. In some embodiments, a form of radiation has a wavelength in the range of about 10 cm to about 100 cm. In some embodiments a form of radiation has a wavelength of about 10 cm to about 20 cm. In some embodiments, a form of radiation has a wavelength of about 12.24 cm. In some embodiments, a form of radiation has a wavelength of about 5.16 cm. In some embodiments, a form of radiation has a wavelength of about 1.24 cm.

ii. Infrared (IR) Light

In some embodiments, a form of radiation useful in, for example, provided methods, is or comprises infrared light. In some embodiments, a form of radiation has a wavelength in the range of about 700 nm to about 1 mm. In some embodiments, a form of radiation is or comprises far-infrared light. In some embodiments, a form of radiation has a wavelength in the range of about 25 μm to about 1 mm. In some embodiments, a form of radiation is or comprises mid-infrared light. In some embodiments, a form of radiation has a wavelength in the range of about 2.5 μm to about 25 μm. In some embodiments, a form of radiation is or comprises near-infrared light. In some embodiments, a form of radiation has a wavelength in the range of about 700 nm to about 2.5 μm.

iii. Visible Light

In some embodiments, a form of radiation useful in, for example, provided methods, is or comprises visible light. In some embodiments, a form of radiation has a wavelength in the range of about 380 to about 700 nm.

iv. Ultraviolet (UV) Light

In some embodiments, a form of radiation useful in, for example, provided methods, is or comprises ultraviolet light. In some embodiments, a form of radiation has a wavelength in the range of about 10 nm to about 380 nm. In some embodiments, a form of radiation is or comprises near-ultraviolet light. In some embodiments, a form of radiation has a wavelength in the range of about 300 nm to about 380 nm. In some embodiments, a form of radiation is or comprises mid-ultraviolet light. In some embodiments, a form of radiation has a wavelength in the range of about 200 nm to about 300 nm. In some embodiments, a form of radiation is or comprises far ultraviolet light. In some embodiments, a form of radiation has a wavelength in the range of about 100 nm to about 200 nm. In some embodiments, a form of radiation is or comprises extreme ultraviolet light. In some embodiments, a form of radiation has a wavelength in the range of about 10 nm to about 100 nm.

D. Measurement of Absorbance Peaks and/or Raman Peaks

In many of the method described herein, one or more absorbance and/or Raman peak(s) are used to measure water concentration in a sample. In some embodiments, an absorbance peak is measured from reflected, transmitted, emitted, scattered light, or combinations thereof. In some embodiments, an absorbance peak is measured from reflected light. In some embodiments, an absorbance peak is measured from transmitted light. In some embodiments, an absorbance peak is measured from emitted light. In some embodiments, an absorbance peak is measured from scattered light.

In some embodiments, one or more absorbance and/or Raman peaks are measured using a device (e.g. spectrometer). In some embodiments, one or more absorbance and/or Raman peaks are measured with a Fourier Transform Infrared Spectrometer (FTIR), a single-beam dispersive infrared spectrometer, a double-beam dispersive infrared spectrometer, a filtermetric spectrometer, a tunable laser based infrared spectrometer, or a Raman spectrometer. In some embodiments, one or more absorbance peaks are measured with a Fourier Transform Infrared Spectrometer (FTIR). In some embodiments, one or more absorbance peaks are measured with a single-beam dispersive infrared spectrometer. In some embodiments, one or more absorbance peaks are measured with a double-beam dispersive infrared spectrometer. In some embodiments, one or more absorbance peaks are measured with a filtermetric spectrometer. In some embodiments, one or more absorbance peaks are measured with a tunable laser based infrared spectrometer. In some embodiments, one or more Raman peaks are measured with a Raman spectrometer. In some embodiments, one or more absorbance peaks are measured with a UV/Vis spectrometer. In some embodiments, a UV/Vis spectrometer is a dispersive, MEMS-based, filtermetric, and/or tunable laser-based spectrometer. In some embodiments, one or more absorbance peaks are measured with a microwave spectrometer. In some embodiments, one or more absorbance peaks are measured using a radiometric-based system. In some embodiments, a radiometric-based system produces a single wavelength, for example, 12.24 cm.

E. "Reagentless" Embodiments

In some embodiments, the present disclosure is directed to methods of measuring water concentration in a sample comprising steps of passing a sample through a membrane that is transparent to one or more forms of radiation in at least one region of interest, irradiating the membrane with the one or more forms of radiation, and determining water concentration in the sample from one or more absorbance and/or Raman peaks.

i. Water Retention Management (e.g., Cooling)

It will be appreciated that management of water retention on a membrane the methods described herein is an important step so as to prevent artificial skewing of results. An exemplary way of managing water retention is through cooling of a membrane or membrane assembly prior to and/or during sample measurement.

In some embodiments of the methods of measuring water concentration in a sample as described herein, a step of passing a sample through a membrane results in extraction of water from the sample and adsorption of a water layer to the membrane. In some embodiments, the membrane is cooled (e.g., to a temperature of 10° C. or lower) prior to the step of passing the sample through the membrane and/or for at least a portion of the passing, irradiating, and determining steps in order to prevent evaporation of the water layer adsorbed to the membrane. Without wishing to be bound by any particular theory, it is believed that cooling a membrane or membrane assembly to prevent evaporation of the adsorbed water layer, increases accuracy and precision of quantification of water content of an oil sample.

In some embodiments, a membrane or membrane assembly is cooled to a temperature between about −196° C. to about 10° C., inclusive. In some embodiments, a membrane or membrane assembly is cooled to a temperature between about −79° C. to about 10° C., inclusive. In some embodiments, a membrane or membrane assembly is cooled to a temperature between about −79° C. to about 0° C., inclusive. In some embodiments, a membrane or membrane assembly is cooled to a temperature between about −20° C. to about 0° C., inclusive. In some embodiments, a membrane or membrane assembly is cooled to a temperature of about −196° C. In some embodiments, a membrane or membrane assembly is cooled to a temperature of about −78° C. In some embodiments, a membrane or membrane assembly is cooled to a temperature of about −20° C. In some embodiments, a membrane or membrane assembly is cooled to a temperature of about −15° C. In some embodiments, a membrane or membrane assembly is cooled to a temperature of about −10° C. In some embodiments, a membrane or membrane assembly is cooled to a temperature of about −5° C. In some embodiments, a membrane or membrane assembly is cooled to a temperature of about 0° C. In some embodiments, a membrane or membrane assembly is cooled with dry ice. In some embodiments, a membrane or membrane assembly is cooled with dry ice and acetone. In some embodiments, a membrane or membrane assembly is cooled with dry ice and isopropanol. In some embodiments, a membrane or membrane assembly is cooled with ice. In some embodiments, a membrane or membrane assembly is cooled with ice and sodium chloride. In some embodiments, a membrane or membrane assembly is cooled with liquid nitrogen.

It will be appreciated that retention of water on a membrane, as extracted from a sample, for a length of time necessary to perform the methods described herein is an important step so as to prevent artificial skewing of results. Without wishing to be bound by any particular theory, it is believed that pre-cooling a membrane or membrane assembly (e.g. cooling a membrane prior to the step of passing the sample through the membrane) may prevent evaporation of adsorbed water from the membrane for the entire length of time required for performing a method described herein. For example, a method described herein may take up to 5 minutes to complete. In some embodiments, pre-cooling a membrane or membrane assembly prevents evaporation of adsorbed water from the membrane for at least about 5 minutes. In some embodiments, pre-cooling a membrane or membrane assembly prevents evaporation of adsorbed water from the membrane for at least about 6 minutes.

ii. Exogenous Water Management (e.g., Vacuum and/or Gas Exposure)

It will be appreciated that management of exogenous water formation during the methods described herein is an important step so as to prevent artificial skewing of results. For example cooling of a membrane or membrane assembly may result in condensation of atmospheric water on a membrane. Two exemplary ways of managing exogenous water formation during or after cooling are through application of vacuum to a membrane or membrane assembly and/or exposure of a membrane to an inert or dry gas. In some embodiments, a membrane or membrane assembly is purged with a gas that is substantially free of water prior to the step of passing the sample through the membrane. Without wishing to be held to a particular theory, it is contemplated that circulation of such a gas prior to passing of the sample through the membrane prevents exposure to and/or condensation of atmospheric water on the membrane. In some embodiments, a gas that is substantially free of water is selected from the group consisting of dry air, a dry inert gas, hydrogen gas, or dry carbon dioxide. In some embodiments, a gas that is substantially free of water is or comprises dry air. In some embodiments, a gas that is substantially free of water is or comprises hydrogen gas. In some embodiments, a gas that is substantially free of water is or comprises dry carbon dioxide. In some embodiments, an inert gas is selected from $N_2$, Argon, Helium, Neon, Krypton, or Xenon. In some embodiments, a gas that is substantially free of water is afforded by attaching a compressed gas to a commercial dryer. For example, in some embodiments, compressed air is attached to a Balston Compressed Air Dryer for use in one or more methods described herein.

In some embodiments, a membrane or membrane assembly is subjected to vacuum while cooling and/or prior to the step of passing a sample through the membrane. Without wishing to be bound by any particular theory, it is believed that subjecting a membrane or membrane assembly to vacuum prevents and/or removes condensation of atmospheric moisture on the membrane. In some embodiments, a membrane or membrane assembly is inserted into a cooling stage and evacuated prior to the step of passing the sample through the membrane. In some embodiments, a cooling stage is or comprises a metal holder surrounded by a reservoir that is in functional contact with the metal holder. In some such embodiments, a reservoir includes a cooling fluid (e.g. antifreeze, dry ice, liquid nitrogen, and the like). In some embodiments, a cooling stage fits in a sample compartment of a spectrometer, for example, without impeding the path of a light beam through a membrane assembly. In some embodiments, a cooling fluid is circulated through a housing that is in contact with a membrane assembly. In some such embodiments, a cooling fluid is cooled using an external chiller, circulated through a jacket functionally connected to a membrane assembly, then returned to the external chiller to be cooled again and recirculated.

In some embodiments, a membrane or membrane assembly is cooled in an enclosure with a controlled atmosphere, such as a controlled-atmosphere glovebox, prior to the step of passing the sample through a membrane. For example, in some embodiments, a membrane or membrane assembly is cooled in an enclosure substantially free of atmospheric water prior to the step of passing the sample through the membrane. In some embodiments, a controlled-atmosphere glovebox is an inert atmosphere glovebox. In some embodiments, a controlled-atmosphere glovebox is a low humidity glovebox.

iii. Management of Water Retention and Exogenous Water Formation During Data Collection Without being bound by any particular theory, it is believed that cooling a membrane or membrane assembly during the steps of the methods described herein can prolong the length of water retention on a membrane and enable data collection over longer periods of time without skewing of results. In some embodiments, a membrane or membrane assembly is cooled for at least a portion of the passing, irradiating, and/or determining steps. In some embodiments, a membrane or membrane assembly is cooled for at least a portion of the passing step. In some embodiments, a membrane or membrane assembly is cooled for at least a portion of the irradiating step. In some embodiments, a membrane or membrane assembly is cooled for at least a portion of the determining step. In some embodiments, a membrane or membrane assembly is continuously cooled through the passing, irradiating, and determining steps. In some embodiments, a membrane or membrane assembly is continuously cooled by pumping a chilled fluid through a jacket surrounding the enclosure of the membrane assembly. Examples of commercially available chillers include Mokon Full Range Heating and Chilling Systems, TC Series Central Chillers, Chiller Systems from Dry Coolers, Inc., and 5HP Industrial Water Cooled Chiller 460V 3-P. Without wishing to be bound by any particular theory, it is believed that continuously cooling a membrane or membrane assembly during data collection will substantially prevent evaporation of water from the membrane. In some embodiments, continuous cooling of a membrane or membrane assembly can enable use of plastic membrane assemblies. Without wishing to be held to a particular theory, it is contemplated that, in the absence of continuous cooling, use of plastic, which is not thermally conductive, in a membrane assembly, likely results in evaporation of adsorbed water within one minute. Accordingly, without use of some cooling or other means, plastic membrane assemblies may not be compatible with various embodiments.

iv. Absorbance and/or Raman Peaks

Depending upon the methods used, observing absorbance and/or Raman peaks of a particular wavelength is considered indicative of the presence of some amount of water in a sample. For example, in some embodiments, wherein a sample is irradiated with infrared light, the presence of water in a sample may be indicated by one or more absorbance and/or Raman peaks are characterized in that they occur at a wavelength selected from the group consisting of about 5185 $cm^{-1}$, about 3420 $cm^{-1}$, about 2127 $cm^{-1}$, about 1650 $cm^{-1}$, about 800 $cm^{-1}$ and combinations thereof. In some embodiments, wherein a sample is irradiated with infrared light, the presence of water in a sample is indicated by one or more absorbance and/or Raman peaks are characterized in that they occur at a wavelength of about 5185 $cm^{-1}$. In some embodiments, wherein a sample is irradiated with infrared light, the presence of water in a sample is indicated by one or more absorbance and/or Raman peaks are characterized in that they occur at a wavelength of about 3420 $cm^{-1}$. In some embodiments, wherein a sample is irradiated with infrared light, the presence of water in a sample is indicated by one or more absorbance and/or Raman peaks are characterized in that they occur at a wavelength of about 2127 $cm^{-1}$. In some embodiments, wherein a sample is irradiated with infrared light, the presence of water in a sample is indicated by one or more absorbance and/or Raman peaks are characterized in that they occur at a wavelength of about 1650 $cm^{-1}$. In some embodiments, wherein a sample is irradiated with infrared light, the presence of water in a sample is indicated by one or more absorbance and/or Raman peaks are characterized in that they occur at a wavelength of about 800 $cm^{-1}$.

In some embodiments, wherein a sample is irradiated with infrared light and wherein the water concentration in the sample is in a range of about 1 ppm to about 1,000 ppm, the one or more absorbance and/or Raman peaks are characterized by a wavelength of about 3420 $cm^{-1}$. In some embodiments, wherein a sample is irradiated with infrared light and wherein the water concentration in the sample is in a range of about 1,000 ppm to about 10,000 ppm, the one or more absorbance and/or Raman peaks are characterized by a wavelength of about 2127 $cm^{-1}$.

In some embodiments, wherein a sample is irradiated with ultraviolet light, the presence of water in a sample may be indicated by one or more absorbance and/or Raman peaks are characterized in that they occur at a wavelength selected from the group consisting of about 10 nm to about 380 nm. In some embodiments, wherein a sample is irradiated with ultraviolet light, the presence of water in a sample may be indicated by one or more absorbance and/or Raman peaks are characterized in that they occur at a wavelength selected from the group consisting of about 190 to 320 nm.

In some embodiments, wherein a sample is irradiated with microwave radiation, the presence of water in a sample may be indicated by one or more absorbance peaks are characterized in that they occur at a wavelength selected from the group consisting of about 1 mm to about 100 cm, and combinations thereof. In some embodiments, wherein a sample is irradiated with microwave radiation, the presence of water in a sample is indicated by one or more absorbance peaks are characterized in that they occur at a wavelength of about 1.24, about 5.16, about 12.24 cm, and combinations thereof.

F. "Reagent-Based" Embodiments

In some embodiments, the present disclosure is directed to methods of measuring water concentration in a sample comprising steps of adding an agent to a sample to react with and/or adsorb water from the sample, thereby forming a solid particulate material; collecting the solid particulate material on a membrane that is transparent to one or more forms of radiation in at least one region of interest; irradiating the membrane with the one or more forms of radiation; and determining water concentration in the sample from one or more absorbance and/or Raman peaks. In some embodiments, the present disclosure is directed to methods of measuring water concentration in a sample comprising steps of adding an agent to a sample to react with water from the sample, thereby forming a solid particulate material; collecting the solid particulate material on a membrane that is transparent to one or more forms of radiation in at least one region of interest; irradiating the membrane with the one or more forms of radiation; and determining water concentration in the sample from one or more absorbance and/or Raman peaks. In some embodiments, the present disclosure is directed to methods of measuring water concentration in a sample comprising steps of adding an agent to a sample to adsorb water from the sample, thereby forming a solid particulate material; collecting the solid particulate material on a membrane that is transparent to one or more forms of radiation in at least one region of interest; irradiating the membrane with the one or more forms of radiation; and determining water concentration in the sample from one or more absorbance and/or Raman peaks.

In some embodiments, the present disclosure is directed to methods of measuring water concentration in a sample comprising steps of adding a membrane that is transparent to one or more forms of radiation in at least one region of interest and coated in an agent to a sample to react with and/or adsorb water from the sample, thereby extracting water from the sample; irradiating the membrane with the one or more forms of radiation; and determining water concentration in the sample from one or more absorbance and/or Raman peaks.

In some embodiments, the present disclosure is directed to methods of measuring water concentration in a sample comprising steps of adding an agent to a sample to react with and/or adsorb water from the sample, thereby forming a solid particulate material; collecting the solid particulate material by centrifugation; depositing the solid particulate material on a membrane that is transparent to one or more forms of radiation in at least one region of interest; irradiating the membrane with the one or more forms of radiation; and determining water concentration in the sample from one or more absorbance and/or Raman peaks.

In some embodiments, the present disclosure is directed to methods of measuring water concentration in a sample comprising steps of adding an agent to a sample to react with and/or adsorb water from the sample, thereby forming a solid particulate material; collecting the solid particulate material by centrifugation; sampling the solid particulate materials by one or more spectroscopic techniques; and determining water concentration in the sample from one or more absorbance and/or Raman peaks. In some embodiments, a spectroscopic technique is selected from the group consisting of transmission, attenuated total reflectance (ATR), diffuse reflectance infrared Fourier transform spectroscopy (DRIFTS), specular reflectance or photoacoustic infrared spectroscopy, Raman spectroscopy, UV-vis spectroscopy, and microwave spectroscopy.

In some embodiments, the present disclosure is directed to methods of measuring water concentration in a sample comprising steps of adding an agent contained in a porous enclosure to a sample to react with and/or adsorb water from the sample, for example, to form a solid particulate material contained in the porous enclosure; removing the porous enclosure; sampling the solid particulate material by one or more spectroscopic techniques; and determining water concentration in the sample from one or more absorbance and/or Raman peaks. In some embodiments, a spectroscopic technique is selected from the group consisting of transmission, attenuated total reflectance (ATR), diffuse reflectance infrared Fourier transform spectroscopy (DRIFTS), specular reflectance or photoacoustic infrared spectroscopy, Raman spectroscopy, UV-vis spectroscopy, and microwave spectroscopy.

In some embodiments, the present disclosure is directed to methods of measuring water concentration in a sample comprising steps of adding a magnetic particulate material coated in an agent to a sample to react with and/or adsorb water from the sample, thereby extracting water from the sample; collecting the magnetic particulate material with a magnet; depositing the magnetic particulate material on a membrane that is transparent to one or more forms of radiation in at least one region of interest; irradiating the membrane with the one or more forms of radiation; and determining water concentration in the sample from one or more absorbance and/or Raman peaks.

i. Agents and Adsorption/Reaction Products

In some embodiments, an agent added to a sample is in the form of a powder. In some embodiments, an agent added to a sample is in the form of a coating on a membrane. In some embodiments, an agent is selected from the group consisting of, but not limited to calcium oxide, magnesium oxide, copper sulfate, zinc oxide, sodium oxide, iron chloride, cobalt nitrate, nickel sulfate, tungsten oxide, alumina, silica, titania, calcium hydride, and combinations thereof. In some embodiments, an agent is or comprises calcium oxide. In some embodiments, an agent is or comprises magnesium oxide. In some embodiments, an agent is or comprises copper sulfate. In some embodiment, an agent may be a hydrate of copper sulfate; for example, a mono-, di-, tri- or tetrahydrate of copper sulfate may be added. In some embodiments, an agent is or comprises zinc oxide. In some embodiments, an agent is or comprises sodium oxide. In some embodiments, an agent is or comprises iron chloride. In some embodiments, an agent is or comprises cobalt nitrate. In some embodiments, an agent is or comprises nickel sulfate. In some embodiments, an agent is or comprises tungsten oxide. In some embodiments, an agent is or comprises alumina. In some embodiments, an agent is or comprises titania. In some embodiments, an agent is or comprises calcium hydride. In some embodiments, an amount of agent is added such that absence of an absorbance peak at 3420 $cm^{-1}$ indicates complete consumption of water in the sample. In some embodiments, formation of a reaction and/or absorption product of an agent with water is indicated by one or more absorbance and/or Raman peaks are characterized by a wavelength in the range of about 50 to about 6000 $cm^{-1}$. Without wishing to be bound by any particular theory, it will be appreciated by one of skill in the art that a characteristic absorbance peak will depend on which of the one or more form of radiation are applied to a sample. Other characteristic peaks may be observed as a result of irradiation with various forms of radiation described herein.

a. Calcium Oxide

In some embodiments, wherein an agent added to a sample is calcium oxide, calcium oxide reacts with water to form $Ca(OH)_2$. In some such embodiments, formation of $Ca(OH)_2$ is indicated by one or more absorbance and/or Raman peaks characterized by a wavelength of about 450, 875, 1443 and 3645 $cm^{-1}$, or combinations thereof. In some such embodiments, formation of $Ca(OH)_2$ is indicated by one or more Raman peaks characterized by a wavelength of about 796 $cm^{-1}$, about 913 $cm^{-1}$, about 1187 $cm^{-1}$, and combinations thereof. In some such embodiments, formation of $Ca(OH)_2$ is indicated by one or more absorbance and/or Raman peaks characterized by a wavelength of about 450 nm.

b. Copper Sulfate

In some embodiments, wherein an agent added to a sample is copper sulfate, copper sulfate adsorbs water to form a hydrate as an adsorption product. In some embodiments, a hydrate of copper sulfate formed as an adsorption product with water is selected from copper sulfate monohydrate, copper sulfate dihydrate, copper sulfate trihydrate, copper sulfate tetrahydrate, copper sulfate pentahydrate, and combinations thereof. In some embodiments, a hydrate of copper sulfate formed as an adsorption product with water is copper sulfate monohydrate. In some embodiments, a hydrate of copper sulfate formed as an adsorption product with water is copper sulfate pentahydrate.

In some embodiments, formation of a copper sulfur hydrate is indicated by one or more absorbance and/or Raman peaks are characterized by a wavelength in a range of about 3500 $cm^{-1}$ to about 3100 $cm^{-1}$, in a range of about 1600 $cm^{-1}$ to about 1800 $cm^{-1}$, or combinations thereof. In some embodiments, formation of a copper sulfur hydrate is indicated by one or more absorbance and/or Raman peaks are characterized by a wavelength of about 3420 $cm^{-1}$, 3190 $cm^{-1}$, 1743 $cm^{-1}$, 1667 $cm^{-1}$, or combinations thereof. In some embodiments, formation of a copper sulfur hydrate is indicated by one or more absorbance and/or Raman peaks are characterized by a wavelength of about 3420 $cm^{-1}$. In some embodiments, formation of a copper sulfur hydrate is indicated by one or more absorbance and/or Raman peaks are characterized by a wavelength of about 3190 $cm^{-1}$.

In some embodiments, formation of a copper sulfur hydrate is indicated by one or more absorbance and/or Raman peaks are characterized by a wavelength of about 1743 $cm^{-1}$. In some embodiments, formation of a copper sulfur hydrate is indicated by one or more absorbance and/or Raman peaks are characterized by a wavelength of about 1667 $cm^{-1}$. In some embodiments, formation of a copper sulfur hydrate is indicated by one or more Raman peaks characterized by a wavelength of about 125 $cm^{-1}$, about 280 $cm^{-1}$, about 455 $cm^{-1}$, about 611 $cm^{-1}$, about 984 $cm^{-1}$, about 1146 $cm^{-1}$, about 3110 $cm^{-1}$, about 3190 $cm^{-1}$, about 3355 $cm^{-1}$, about 3475 $cm^{-1}$, or combinations thereof.

In some embodiments, formation of a copper sulfur hydrate is indicated by one or more absorbance and/or Raman peaks characterized by a wavelength of about 800 nm.

In some embodiments, wherein an agent added to a sample is copper sulfate, and wherein copper sulfate adsorbs water to form a copper sulfate monohydrate, one or more absorbance and/or Raman peaks are characterized by a wavelength of about 3190 $cm^{-1}$, about 1743 $cm^{-1}$, or combinations thereof. In some embodiments, wherein an agent added to a sample is copper sulfate, and wherein copper sulfate adsorbs water to form a copper sulfate monohydrate, one or more absorbance and/or Raman peaks are characterized by a wavelength of about 3190 $cm^{-1}$. In some embodiments, wherein an agent added to a sample is copper sulfate, and wherein copper sulfate adsorbs water to form a copper sulfate monohydrate, one or more absorbance and/or Raman peaks are characterized by a wavelength of about 1743 $cm^{-1}$.

II. Kits

In some embodiments, the present disclosure is directed to kits for measuring water concentration in a sample. In some embodiments, a kit as provided herein may comprise any of the components described elsewhere in this disclosure. By way of non-limiting example, in some embodiments, a kit for measuring water concentration comprises: one or more doses of an agent and a membrane assembly containing a membrane (e.g., a membrane is transparent to one or more forms of radiation in at least one region of interest). In some embodiments, a dose of an agent is provided in a vial, capsule, bottle, and the like. In some embodiments, a capsule dissolves upon contact with an oil sample to exposure the agent to the oil sample.

III. Systems

In some embodiments, the present disclosure encompasses systems for measuring water concentration in a sample. In some embodiments, a system for measuring water concentration in a sample comprises a membrane that is transparent to one or more forms of radiation in at least one region of interest, an enclosure that retains and/or removably retains the membrane and includes an optically transmissive region through which radiation may pass, and one or more inlet(s) and/or outlet(s) for the enclosure. In some embodiments, a system for measuring water concentration in a sample comprises a membrane that is transparent to one or more forms of radiation in at least one region of interest, an enclosure that retains the membrane and includes an optically transmissive region through which radiation may pass, and one or more inlet(s) and/or outlet(s) for the enclosure. In some embodiments, a system for measuring water concentration in a sample comprises a membrane that is transparent to one or more forms of radiation in at least one region of interest, an enclosure that removably retains the membrane and includes an optically transmissive region through which radiation may pass, and one or more inlet(s) and/or outlet(s) for the enclosure. An optically transmissive region may be comprised of any application-appropriate material. By way of non-limiting example, in some embodiments, an open space or comprise glass, plastic, salts, silicon, germanium, or the like, so long as it allows one or more particular wavelength(s) of radiation to pass through. For example, a salt may comprise NaCl, ZnSe, $CaF_2$, or the like.

In some embodiments, an enclosure is or comprises a housing. In some embodiments, an enclosure is or comprises a metal housing. In some embodiments, an enclosure is or comprises a plastic housing.

In some embodiments, an inlet and/or outlet in an enclosure is or comprises a connector. In some embodiments, a connector allows for functional connection between components of a membrane assembly and/or functional connection of a membrane assembly to an external component. In some embodiments, a connector is a Luer™ lock. In some embodiments, a connector is a slip tip connector.

In some embodiments, a system further comprises a pump. In some embodiments, an inlet and/or outlet of an enclosure is adapted for attachment to a pump. In some embodiments, a pump is capable of one or more of: creating a vacuum, and introducing a gas that is substantially free of water into and/or through at least a portion of the enclosure.

In some embodiments, a system further comprises a cooling means. In some embodiments a cooling means is or comprises a jacket surrounding the enclosure of the membrane assembly through which a chilled fluid is pumped. Examples of commercially available chillers include Mokon Full Range Heating and Chilling Systems, TC Series Central Chillers, Chiller Systems from Dry Coolers, Inc., and 5HP Industrial Water Cooled Chiller 460V 3-P.

In some embodiments, a system further comprises a support for the membrane (e.g. a porous support). In some embodiments, a support for a membrane is or comprises any form of support for the membrane that provides mechanical stability to a membrane. For example, a support for a membrane prevents the membrane from tearing or falling from its position. As such, a support for a membrane provides for a membrane to be maintained in a desired position. In some embodiments, the porous support is or comprises metal. In some embodiments, the porous support is or comprises plastic. In some embodiments, a membrane support is transparent in one or more regions of interest.

In some embodiments, a system further comprises one or more sealing component(s). In some embodiments, a sealing component provides a seal to a membrane assembly to prevent leakage of one or more substances (e.g. a gas or a liquid) into and/or out of a membrane assembly. In some embodiments, a sealing component is or comprises an O-ring seal. In some embodiments, a sealing component is or comprises aluminum, copper, bronze, or combinations thereof. In some embodiments, a sealing component is or comprises glue paste (e.g. Flex Paste™). In some embodiments, a sealing component is or comprises tape (e.g. Flex Tape™, Teflon™ tape).

EXEMPLIFIED EMBODIMENTS

In order that the application may be more fully understood, the following examples are set forth. It should be understood that these examples are for illustrative purposes only and are not to be construed as limiting in any manner.

While the examples provided herein have been described largely with respect to quantification using the intensity of bands measured using FTIR, it will be appreciated by one of skill in the art upon reading the present disclosure that quantification can be performed by any number spectroscopic techniques know in the art, such as ATR, DRIFT, specular reflectance or photoacoustic infrared spectroscopic techniques, Raman spectroscopic techniques, UV/Vis spectroscopic techniques, and microwave spectroscopic techniques.

Study 1. Reagentless Method

Three oil samples were selected for Study 1: SMB power steering fluid, density 0.95 g/mL, distributed by SMB International LLC, West Long Branch, NJ, USA (Oil 1); Golden Chef vegetable oil, density 0.94 g/mL, distributed by Stratas Foods LLC, Memphis, TN 38016 (Oil 2); and an extreme pressure (EP) fluid (MASTER PRO GL-5 SAE 85W-140 Gear Oil), density 0.98 g/mL, distributed by Ozark Automotive distributors, Springfield, MO, 65801, USA (Oil 3). Notably, these three types of oil have been particularly difficult to study by existing ASTM method E2412. Samples were analyzed using methods of the present disclosure, as well as by KFT for comparison.

Oil samples containing 1 to 5,000 ppm of water were prepared by adding a known volume of 50% water in acetone (by volume) to a beaker containing 25 ml of oil. Each mixture was stirred on a magnetic plate for 2 hours to ensure sample homogeneity and to allow acetone evaporation. Oil samples containing >5000 ppm were prepared with more vigorous stirring using an overhead propeller. A known volume of the samples was extracted from the stirred beaker using a micropipette or a 10 ml syringe. Samples were either immediately transferred to a stoppered vessel for measurement by KFT or processed with the membrane.

KFT of pure oils and water in oil samples were measured volumetrically on a Metrohm Titrando 841 or coulometically on a Metrohm 756 KFT. HYDRANAL®—Softer (Crude) oil was used as titration reagent for volumetric titration and HYDRANAL®—Coelomate AG was used for coulometric KFT. KFT instruments were calibrated using a 1 ml of HYDRANAL® Water Standard 1%.

A stainless-steel membrane assembly (part no. 1980-001) obtained from Whatman was modified by removing the outlet tube connector to facilitate transmission of the IR beam through the membrane assembly. IR transparent membranes (13 mm diameter) were obtained from Orono Spectral Solutions Inc. Membranes had a thickness of approximately 37 µm and a measured void fraction of about 55%. Membrane assembly (see FIG. 1) consisted of a 13 mm metal screen, followed by the membrane, then two Teflon™ O-rings (13 mm OD, 11 mm ID diameter). The metal screen provided mechanical stability and had 50% throughput across the entire IR spectral region. The two Teflon™ rings provided a seal between the membrane and the top portion of the membrane housing. All spectra were recorded in transmission mode through the Luer™ lock of the assembly mounted at the sample focus of an ABB-Bomem FTLA 2000 FTIR. Transmission through a membrane assembly containing only the metal screen was 40% relative to an open beam reference. Transmission through the device containing the membrane was about 40% relative to open beam.

To flow an oil sample through the membrane assembly, a 10 mL disposable syringe containing a known volume of sample was connected to the Luer™ lock of the membrane assembly. Sample (typically 1-10 ml) was pushed through the membrane using a syringe pump (NE-1600, USA) at a flow rate of 1 ml/min. The syringe pump was placed vertically to ensure that sample passed uniformly upwards through the membrane. Sample remaining in the headspace of the membrane assembly (about 1 mL) was pushed through the membrane by applying a short 1-3 second pulse of $N_2$ gas. The membrane remained fully wetted by the oil, to afford transparency in the IR spectral region and to minimize evaporation of the adsorbed water.

Figure 2:
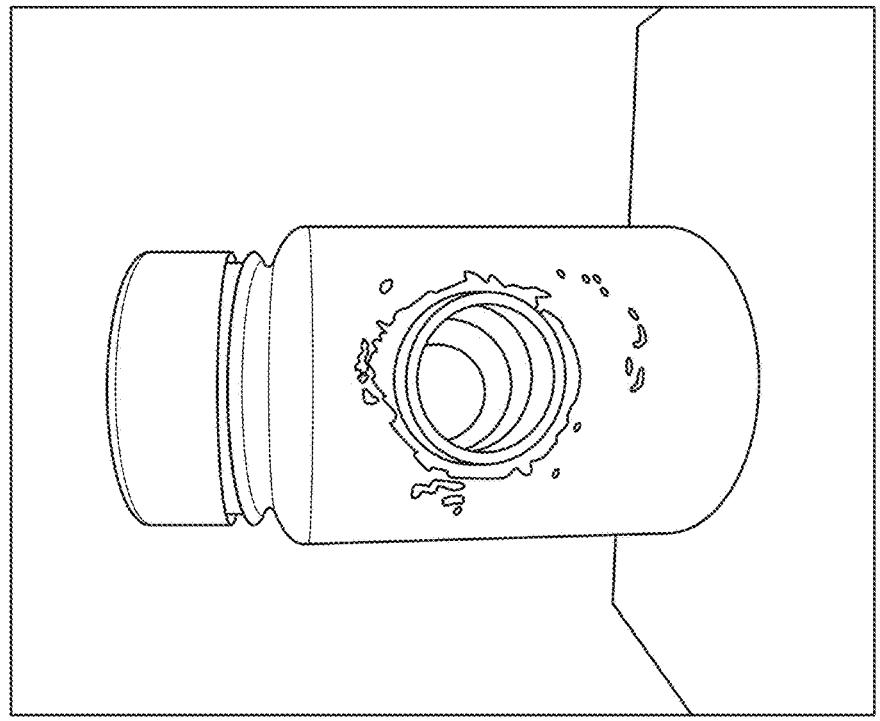
FIG. 2 depicts an exemplary picture and schematic of a sample holder in accordance with one or more embodiments of the present disclosure.
Figure 2:
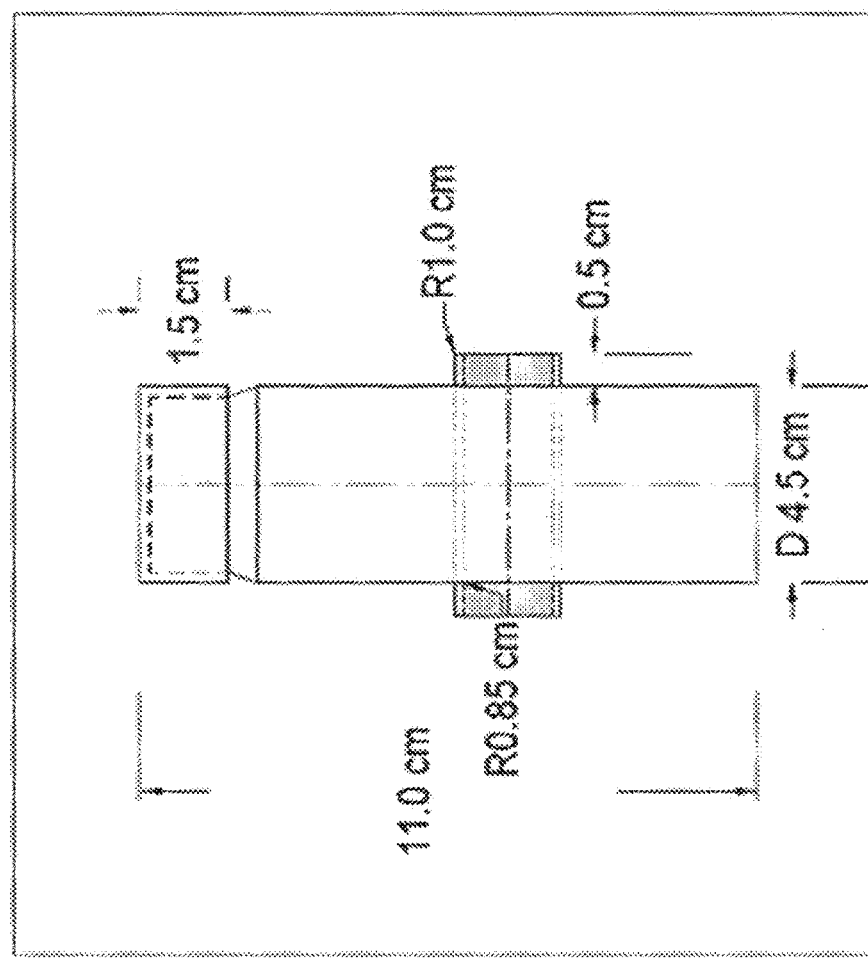

The membrane assembly was then mounted in a home-built sample holder (see FIG. 2) that was cooled to −20° C. A sample holder that operated at temperatures below 0 ° C. prevented evaporation of water from the membrane. Recording spectra over 10 second intervals using a standard sample holder, rather than a cooled sample holder, resulted in a decrease in the IR bands due to water with each spectrum. Use of the sample holder pre-cooled to −20° C. resulted in no change in intensity of the water bands for at least 6 minutes, which exceeded the 1-2 minutes used to record an infrared spectrum. Substituting metal housing of the sample holder for plastic housing resulted in a decrease in retention time of the water bands from 6 minutes to 1 minute. Without wishing to be held to a particular theory, such a decrease in retention time would likely not be observed with a continuously cooled system. Accordingly, encompassed in the present disclosure is the recognition that use of a continuously cooled sample stage would enable use of disposable plastic units.

For water in oil samples with water concentrations>1000 ppm, 30 µl of sample was deposited directly onto the membrane using a micropipette. A membrane (13 mm dia.) was placed on top of a screen and the micropipette was moved across the entire surface of the membrane, while ejecting the 30 µl to ensure equal distribution across the entire surface. The membrane was placed inside the metal assembly and then inserted inside the sample holder that was pre-purged with $N_2$ gas. The openings of the sample holder were covered with parafilm and the assembly placed inside the freezer for 30 minutes. Then the sample holder was mounted in the FTIR sample compartment and an IR spectrum recorded.

All spectra were recorded on an ABB-Bomem FTLA 2000 FTIR equipped with a DTGS detector. A spectrum consisted of 100 coadded interferograms at 8 $cm^{-1}$ resolution and required about 1 minute to record. A prerecorded reference spectrum was used in all measurements. The reference was recorded through a membrane that was fully wetted with about 5 µl of the pure oil. Reference spectra were recorded weekly. However, no differences in the measured amount of water was detected when using the current reference spectrum or with previously stored reference spectra that were recorded several months prior to the measurement.

Transmission IR spectra of all samples were measured for comparative purposes. Spectra were recorded using a 1.2 mm path length transmission liquid cell equipped with $CaF_2$ windows. A reference spectrum was recorded through an empty transmission cell prior to adding sample. The transmission cell was cleaned between measurements by flushing with acetone, followed by purging with $N_2$ gas. Verification of cleanliness was performed by recording a spectrum through the cell, using an open beam as the reference. The cleaning procedure was repeated until no residual oil or acetone bands were detected in the spectrum.

Figure 3:
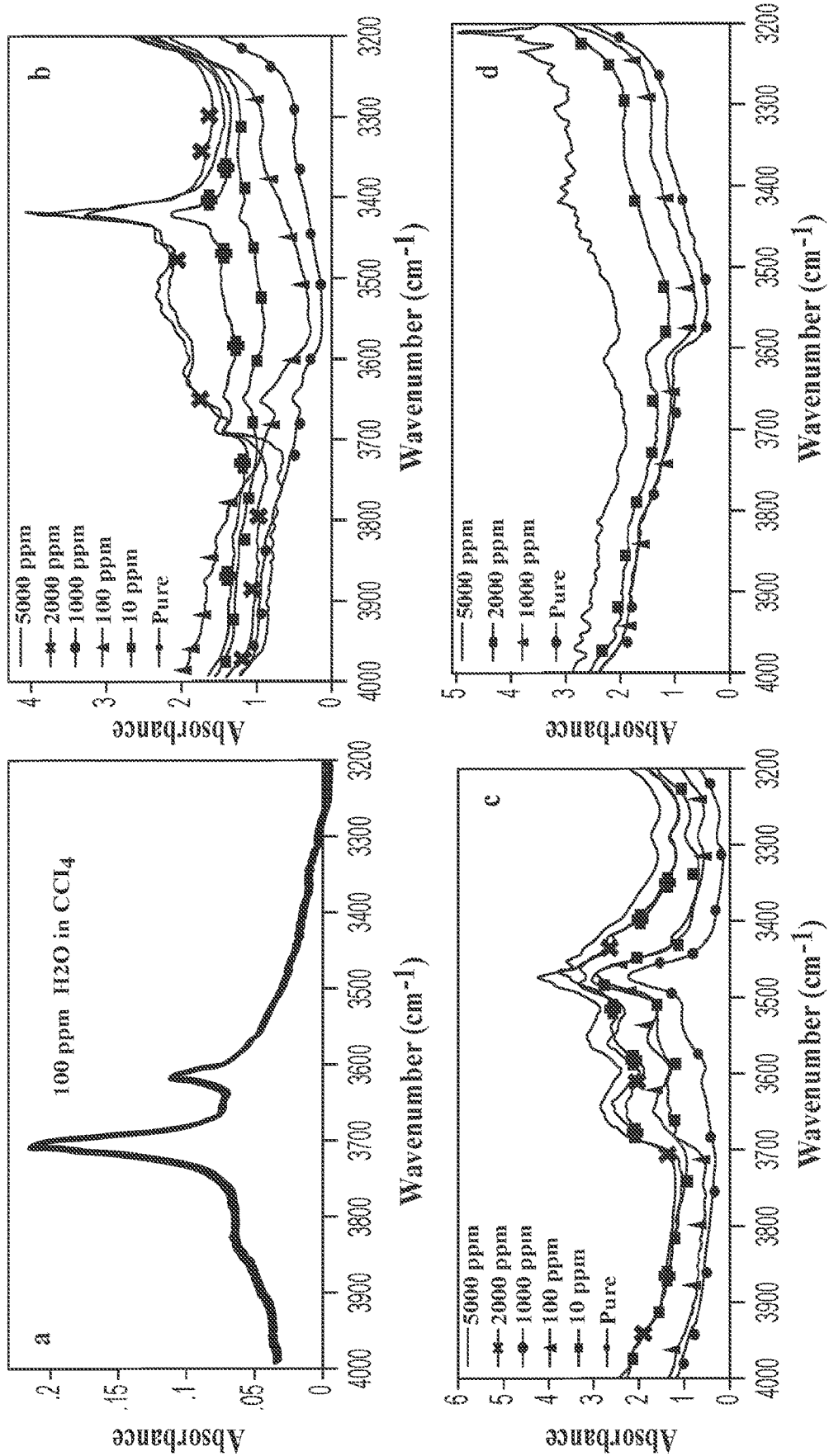
FIG. 3 depicts exemplary plots of infrared spectra of water in CCl$_4$ (Panel A), power steering fluid (Panel B), vegetable oil (Panel C), and EP fluid (Panel D) in accordance with one or more embodiments of the present disclosure.

Measurement of water by the standard ASTM method E2412 employs a water band at 3400 $cm^{-1}$. This band represents the OH stretching modes of water as a result of the hydrogen-bonding between formed between water molecules in the liquid state. However, when water is dissolved, rather than simply dispersed as water droplets, in oil this band is distorted or in some cases disappears all together. Changes in the water band are dependent on the specific interaction with the oil matrix. Consequently, in order to obtain an accurate measurement, a matrix specific calibration is required. To illustrate this point, spectra depicted in FIG. 3 represent water dissolved in $CCl_4$ (Panel A), power steering fluid (Panel B), vegetable oil (Panel C), and EP fluid (Panel D). The $CCl_4$ (100 ppm of water) spectrum exhibits two sharp bands at 3707 $cm^{-1}$ and 3616 $cm^{-1}$ assigned to the asymmetric and symmetric OH stretching modes of water, respectively. The power steering fluid spectra exhibit two sharp bands at 3450 $cm^{-1}$ and 3421 $cm^{-1}$, and at higher concentration a broad band near 3400 $cm^{-1}$ is also observed. The vegetable oil spectra exhibit a series of broad bands over the region of 3700 $cm^{-1}$ to 3400 $cm^{-1}$. The EP fluid spectra lack a significant band near 3400 $cm^{-1}$. The variability in the spectra depicted in FIG. 3 are indicative of the challenges associated with standard method ASTM E2412 for water measurement and further demonstrate the need for a matrix-specific calibration.

Figure 4:
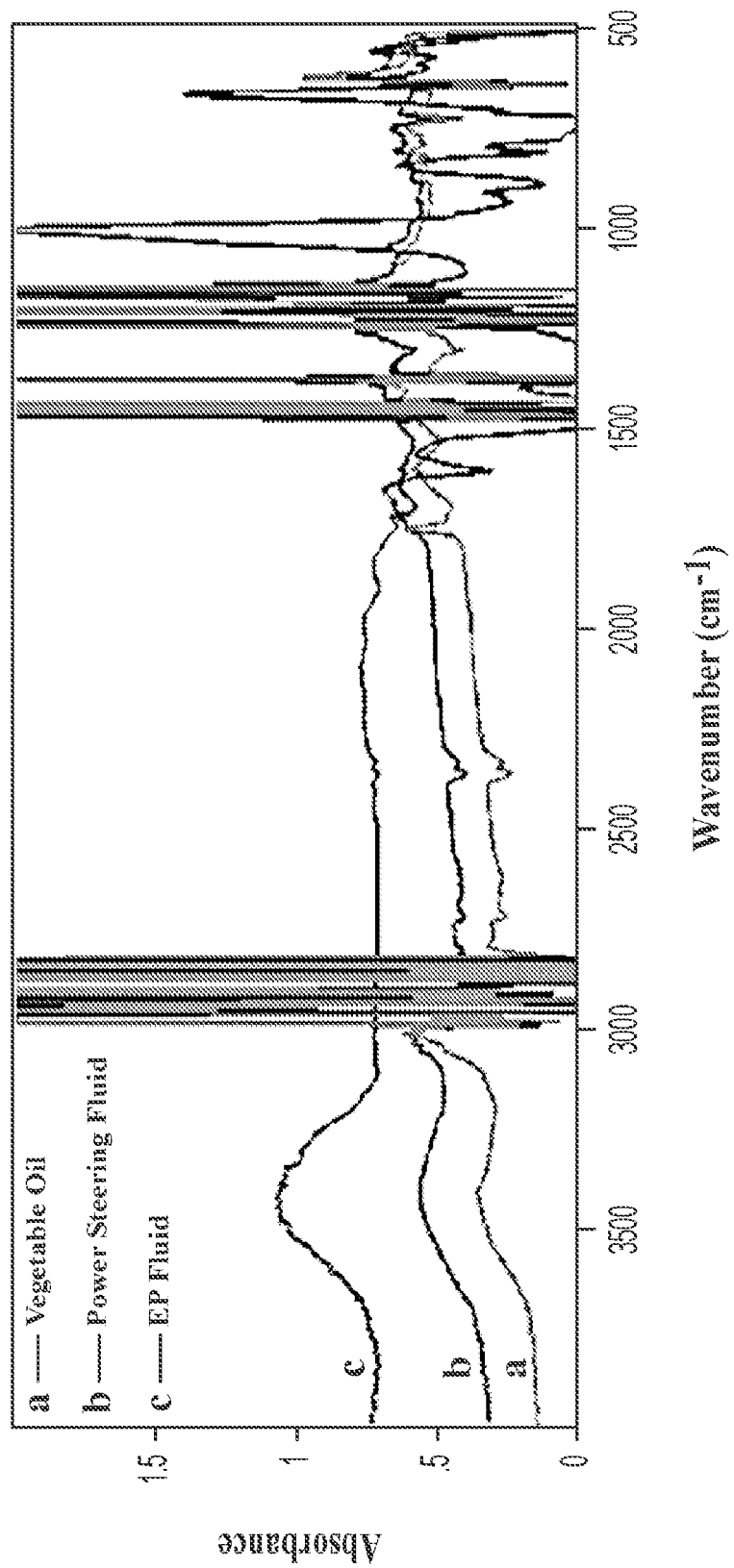
FIG. 4 is an exemplary plot of infrared spectra of (a) water in a vegetable oil sample (3 mL, 10 ppm), (b) water in a power steering oil sample (3 mL, 10 ppm), and (c) water in an EP fluid sample (30 μL, 3000 ppm) in accordance with one or more embodiments of the present disclosure.

Processing a sample with a membrane described herein removes the need for a matrix specific calibration as contact of the water-in-oil sample with the membrane fibers results in the extraction of dissolved water and breaking of water droplets as the water from the sample adsorbs to the membrane. In all samples, a spectrum characterized by a broad band around 3420 $cm^{-1}$ was observed. Exemplary spectra are depicted in FIG. 4. Spectrum (a) of FIG. 4 depicts data collected from a 3 mL sample of vegetable oil with a 10 ppm of water. Spectrum (b) of FIG. 4 depicts data collected from a 3 mL sample of power steering oil with a 10 ppm of water. Spectrum (c) of FIG. 4 depicts data collected from a 30 µL sample of EP fluid with a 3000 ppm of water. The region between 3150 and 2485 $cm^{-1}$ spectrum (c) was blanked to remove C—H bands of the EP fluid for clarity.

Figure 5:
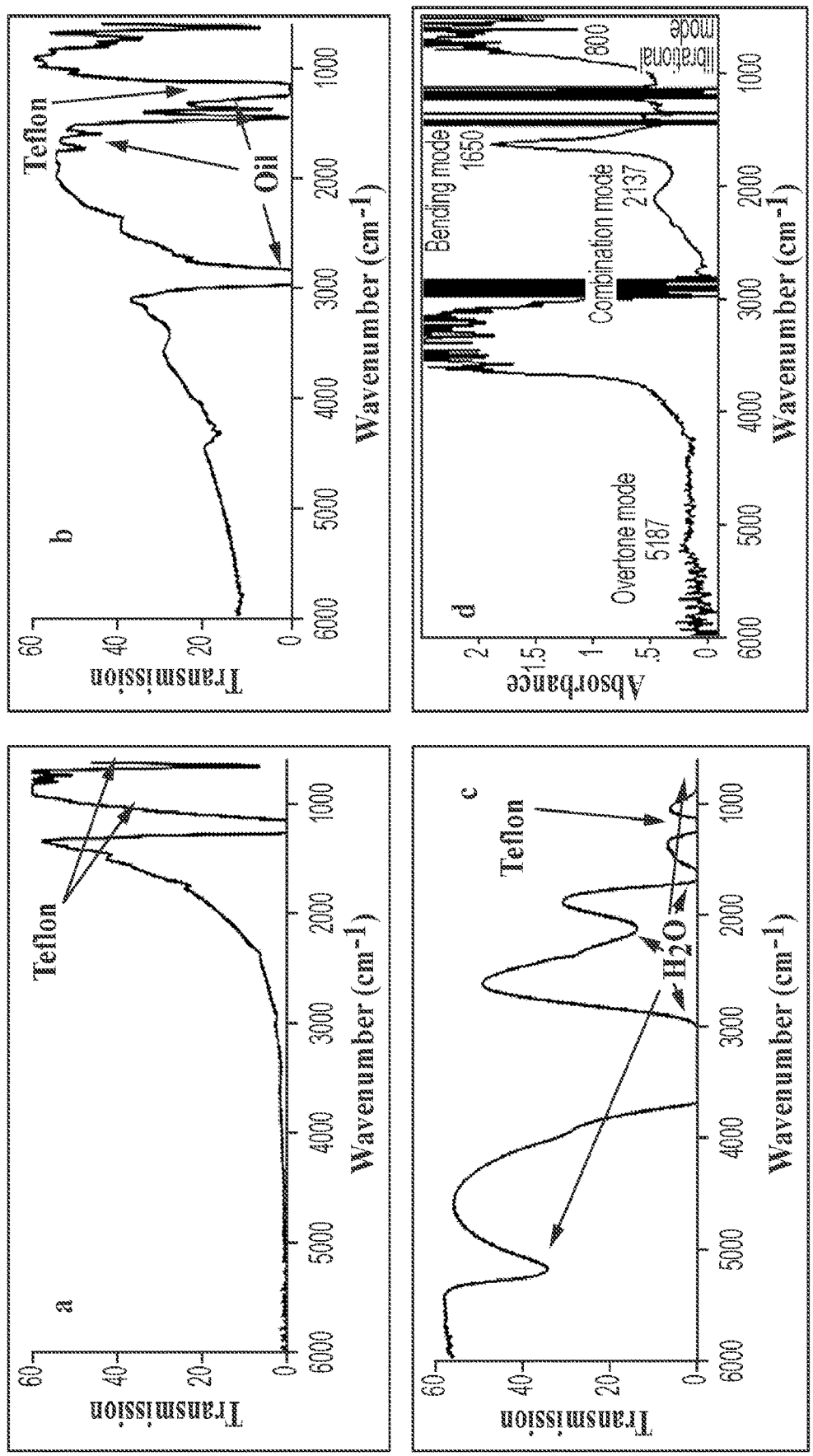
FIG. 5 depicts exemplary plots of transmission spectra of a dry membrane (Panel A), power steering fluid (Panel B), and water (Panel C), and a plot of an absorbance spectrum for a water in power steering fluid sample (1 mL, 1000 ppm; Panel D) in accordance with one or more embodiments of the present disclosure.

Reference spectra were recorded using a membrane saturated with pure oil. When transmission spectra were collected through a dry membrane, the transmission at 3420 $cm^{-1}$ is reduced to about 1% T (FIG. 5 (a)), rendering the membrane too opaque for measurements. In contrast, by filling the voids with oil, transparency increases to 30% T at 3420 $cm^{-1}$ (FIG. 5(b)). If a membrane is fully saturated with water, the membrane becomes transparent (FIG. 5(c)). However, the intensity of the band at 3420 $cm^{-1}$ requires quantification of water via weaker water modes, such as the combination modes at 2174 $cm^{-1}$ in the IR region or 5185 $cm^{-1}$ in the near-IR region; an example spectrum is seen in FIG. 5(d) for a 1 mL sample of power steering fluid with a 1000 ppm of water. The spectrum shown in FIG. 5(d) exhibits narrow regions over the ranges 3100-2800 $cm^{-1}$, 1400-1200 $cm^{-1}$ and 800-600 $cm^{-1}$ that are opaque due to C—H stretching, bending, and rocking modes, respectively, of the oil. Vegetable oil has an additional opaque region between 1750 and 1650 $cm^{-1}$ due to the presence of a C=O stretching mode (not shown). In FIG. 4(d), the band at 3420 $cm^{-1}$ exceeds a value of 2 absorbance units whereas, other water peaks at 1650 $cm^{-1}$ (water bending mode), and 2127 $cm^{-1}$ (combination mode) are clearly visible and facilitate quantification of water. In addition, a broad peak centered at 800 $cm^{-1}$ due to a liberational mode of water is also evident. Therefore, the ability to use other weaker bands of water further expands the detection range of the methods described herein.

Figure 6:
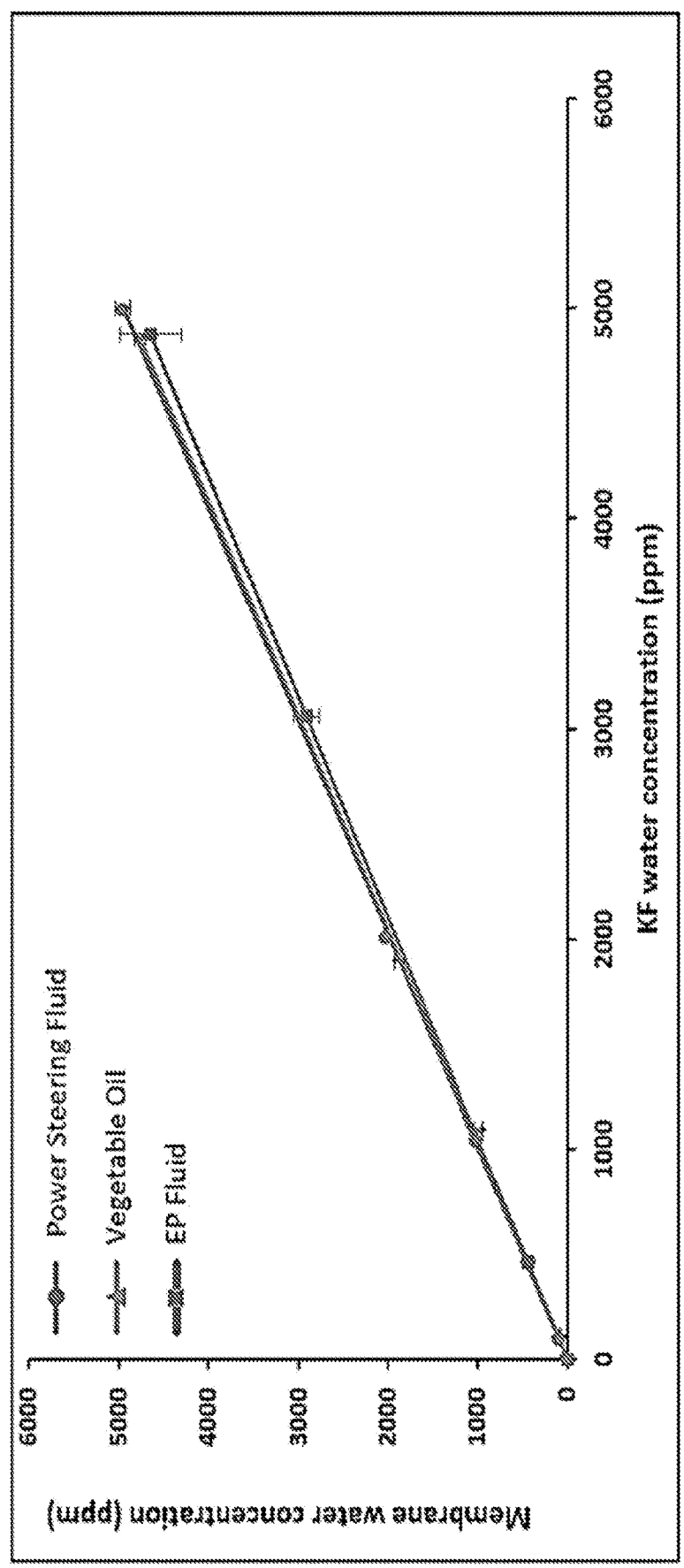
FIG. 6 is an exemplary plot comparing concentration of water in oil samples as measured by the method described in Study 1 and Karl Fischer titration (KFT) in accordance with one or more embodiments of the present disclosure.

Water concentration was determined for several samples using both the method described herein and Karl Fischer titration. The results are plotted in FIG. 6. Measurements were performed in triplicate. Error bars depicted 95% confidence level. The highest %R SD of 9.6% was observed for power steering fluid with a 1 ppm of water; % RSD for all other measurements was in the range of 2-8.6%. The average % RSD across all measurement was 4.9%. Linear regression with statistical weights yielded slopes of 0.99±0.06, 0.98±.01 and 0.95±0.03 (at 95% confidence level, 5 different concentrations) for power steering fluid, vegetable oil and EP oil, respectively. The corresponding $R^2$ values for all three linear regressions with statistical weights were >0.9995, showing exceptional linearity of detection over the entire range from 1 ppm to 5,000 ppm.

No calibrations using matrix spikes were performed for any of the IR measurements. Literature values for the extinction coefficients were used to convert absorbance values of IR bands to ppm levels of water in oil. Agreement with KFT values and those calculated using known extinction coefficients confirms dispersion of liquid water on the membrane, and that the water is devoid of any additives or interferents that would distort the spectrum. Furthermore, slope values of 0.99 and 0.98 for vegetable oil and power steering fluid indicates essentially complete capture of water on the membrane over the entire concentration range. In this example, the slightly decreased slope of 0.95 for EP fluid is attributed to a small fraction of water droplets not captured by the membrane. Total time for sample processing was about 5 minutes per sample, which is significantly faster than the 2 hours per sample needed for volumetric Karl Fischer titration (for samples>1000 ppm) and on par with the 10 minutes per measurement for coulometric Karl Fischer titration (samples<1000 ppm).

Quantification of water concentration using height of absorbance peaks was performed in accordance with the Beer-Lambert relationship:

$$A = \epsilon c l \quad \text{(Eq. 1)}$$

where, A is measured peak height or area, $\epsilon$ is the molar extinction coefficient with units of $M^{-1}$ $cm^{-1}$, l is path length of the cell, and c is concentration of analyte (i.e. water) in solution.

When using a membrane, there is no cell of fixed path length; mass of target analyte is captured on the surface by passing a known volume of solution through the membrane. In this case, the measured peak height is proportional to the concentration-path length (c×l), which has units of mass of analyte per area of membrane. The molar extinction coefficient of Beer's Law relationship in Equation 1 is replaced by the extinction coefficient with units of $cm^2/g$. From Equation 1, a value for the mass of analyte/area is determined and in multiplying this value by membrane area (area), we obtain the total mass of water ($M_{H2O}$) deposited on the membrane (Equation 2):

$$M_{H2O} = A^* \text{area}/\epsilon \quad \text{(Eq. 2)}$$

Once the total mass of analyte extracted is determined, concentration of water in a sample ($C_{H2O}$) in units of ppm is calculated by dividing $M_{H2O}$ by total mass of the sample passed through the membrane. For concentrations at and below 5,000 ppm, water mass is negligible, and total mass of the sample is simply the volume of oil (V) passed through the membrane multiplied by density ($\rho$) of the oil.

$$C_{H2O} \text{ (ppm)} = M_{H2O}(g)/\{V(ml)^*\rho(g/ml)\} \times 10^6 \quad \text{(Eq. 3)}$$

Band intensity and detection range depend linearly on the mass of water deposited on the membrane (hence, proportional to the volume of oil passed through the membrane) and is inversely proportional to the area of the membrane. For example, passing a sample volume through a 25 mm dia. membrane would produce infrared bands of the analyte that are about 4 times less intense than obtained for passing the same volume through a 13 mm dia. membrane. The membrane used in Equation 2 is defined as the effective area that the fluid passes through. For this study, while the membrane assembly uses 13 mm diameter membranes, the use of Teflon™ O-rings reduces the effective area to 11 mm in diameter.

Quantification based on absorbance values between 0.015 to 1.5 absorbance units is used for these measurements. For peak intensities below 0.015, baseline instabilities decrease accuracy of the measurement. For peak intensities exceeding 1.5 absorbance units, poor signal-to-noise ratios and responsivity is observed. To achieve an absorbance in these ranges, sample volume and membrane size are varied.

The size of IR beam used in this study was 4 mm in diameter (i.e. smaller than the 11 mm membrane active diameter). Precision of the measurements indicates uniform distribution across the membrane area and allows for under sampling of the membrane. Given the average % RSD of 4.9%, variation in water distribution across the membrane is <5%.

For measurement of low water concentrations, for example, in the range of 1 to 100 ppm, quantification was performed using the band at 3420 $cm^{-1}$ and an extinction coefficient of 5589 $cm^2/g$. As water concentrations increase, for example, for sample with >100 ppm of water concentrations, bands at 5185, 2127, and 1620 $cm^{-1}$ are used. Extinction coefficients for various water bands are listed in Table 1. It is envisioned that the methods described herein, in some embodiments, are useful over a detection range of 1 to 21,000 ppm.

TABLE 1

Extinction Coefficients ($cm^2/g$) of Water Bands

| Peak position ($cm^{-1}$) | Extinction coefficient ($cm^2/g$) |
|---|---|
| 1640 | 1202 |
| 2127 | 192 |
| 3400 | 5589 |
| 5185 | 100 |

Strategies for data collection of samples containing higher water concentration include: increasing membrane diameter, using a stack of two or more membranes, and directly pipetting a small volume of sample (i.e. 30 µL) onto a membrane. When directly pipetting a volume of sample on a membrane, the volume of sample for full coverage is, in some embodiments, approximately 12 times the void volume of the membrane.

Applying the method described in this study to samples of unknown concentrations, 1 mL of sample was passed through a 13-mm membrane. If the initial measurement indicated a concentration below 10 ppm, a second sample was run using 30 mL. For samples in the concentration range of 1 ppm to 100 ppm, the 3420 $cm^{-1}$ band was used for quantification. For samples in the concentration range of 100 to 1000 ppm, the 1650 or 2127 $cm^{-1}$ band was used. If the initial measurement indicated a concentration >1000 ppm, a second sample of 30 µL was pipetting directly onto the membrane and the 3420 $cm^{-1}$ band was used for quantification. These metrics are summarized in Table 2.

TABLE 2

Sample volumes and water bands used to measure water concentrations

| Concentration (ppm) | Volume | Abs. (3420 $cm^{-1}$) | Abs. (1650 $cm^{-1}$) | Abs. (2127 $cm^{-1}$) |
|---|---|---|---|---|
| 1 | 30 ml | 0.12 | — | — |
| 10 | 1 ml | 0.04 | — | — |
| 100 | 1 ml | 0.4 | 0.08 | — |
| 1000 | 1 ml | >1.5 | 0.83 | 0.13 |
| 2000 | 30 µl | 0.26 | 0.067 | — |
| 3000 | 30 µl | 0.39 | 0.10 | 0.015 |
| 5000 | 30 µl | 0.60 | 0.15 | 0.03 |

Study 2. Use of Calcium Oxide

Three oil samples were selected for Study 2: SMB power steering fluid, distributed by SMB International LLC, West Long Branch, NJ, USA (Oil 1); Golden Chef vegetable oil, distributed by Stratas Foods LLC, Memphis, TN 38016 (Oil 2); and an extreme pressure (EP) fluid (MASTER PRO GL-5 SAE 85W-140 Gear Oil), distributed by Ozark Automotive distributors, Springfield, MO, 65801, USA (Oil 3). Calcium oxide (CaO, 99.9%) was obtained from Sigma Aldrich. The IR transparent membranes (0.45 µm/13 mm) were obtained from Orono Spectral Solutions Inc.

Oil samples containing 1 to 10,000 ppm of water were prepared by adding a known volume of 50% water in acetone (by volume) to a beaker containing 25 ml of oil. Each mixture was stirred on a magnetic plate for 2 hours to ensure sample homogeneity and to allow acetone evaporation. Oil samples containing >5000 ppm of were prepared with more vigorous stirring using an overhead propeller.

Calcium oxide was prepared by first grinding with a mortar and pestle to achieve an average diameter of approximately 1.5 µm as measured by dynamic light scattering on a Malvern Zetasizer. Ground calcium oxide was transferred to a covered crucible and heated in a furnace at 850° C. for two hours to remove residual $Ca(OH)_2$ and $CaCO_3$. The sample was cooled to room temperature in a desiccator flushed with dry $N_2$ gas. Known amounts of CaO powder were measured and transferred to sealed vials in a glove box.

Figure 7:
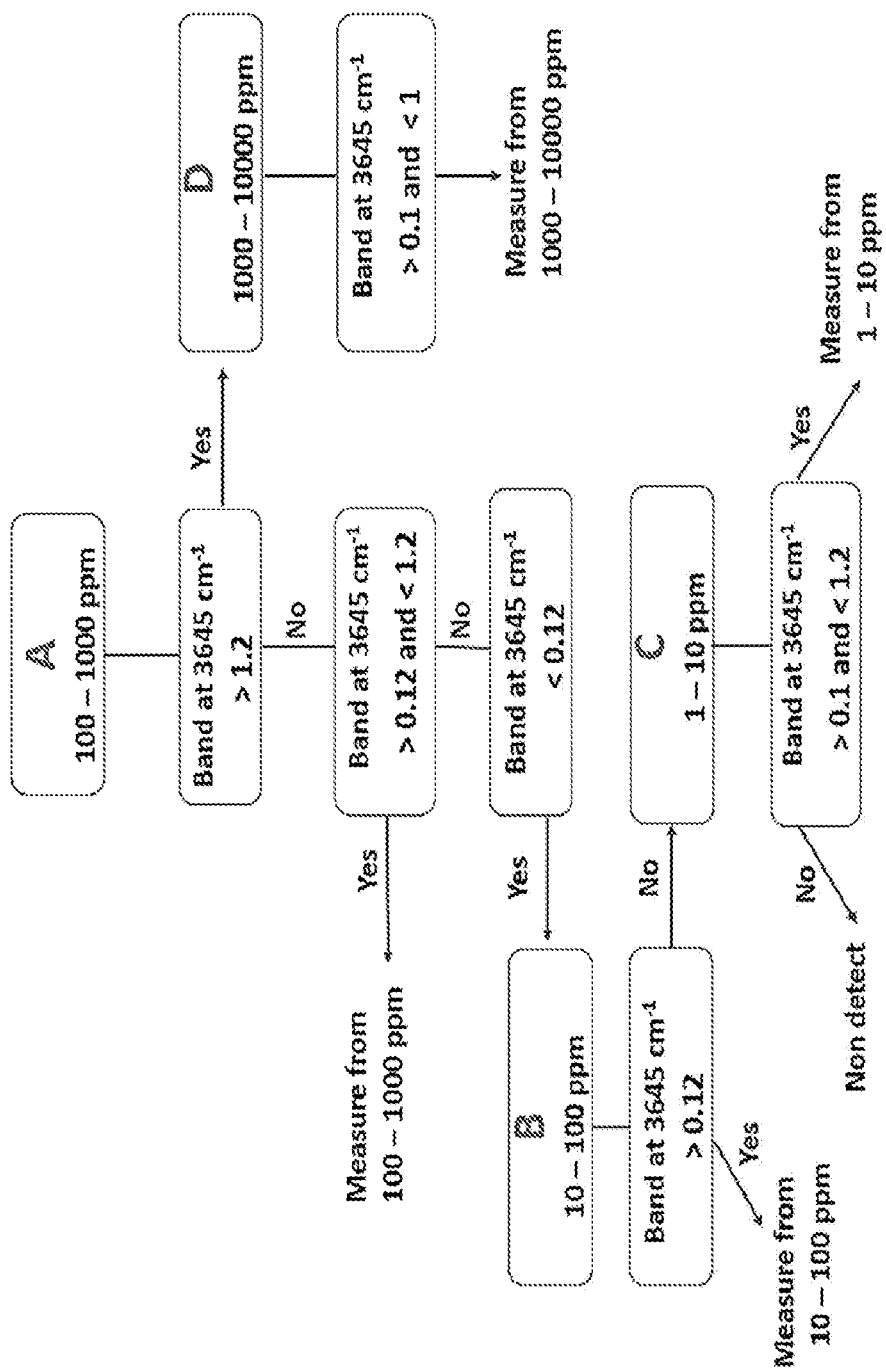
FIG. 7 is an exemplary flow chart describing a process for determining water concentration in a sample over a concentration range of 1 to 10,000 ppm in accordance with one or more embodiments of the present disclosure.

Samples of unknown concentration were analyzed according to a procedure outlined in the flow chart depicted in FIG. 7. In Step A, a sample was tested for water levels in the range of 100 to 1000 ppm. A vial containing 155.5 mg CaO was added quickly (2-3 seconds) to a stirred vial containing 5 ml of oil. The suspension was stirred for 30 minutes to ensure complete reaction of the water with the CaO powder. A 0.4 ml aliquot of the stirred suspension was then drawn into a Luer-Lock™ syringe. The syringe was connected to the Luer-Lock™ of the membrane assembly and this volume was pushed into the headspace. The same membrane assembly as described in Study 1 was used for Study 2. The membrane assembly with sample was held vertically and a 1-2 second pulse of $N_2$ gas was applied to push the sample through the membrane.

A plastic 3×2 in. card was used to hold the membrane assembly at the sample focus of an ABB Bomem FTLA 2000 FTIR, equipped with a DTGS detector. The card had a 6 mm hole in the center and a plastic male Luer-lock™ connector epoxied to the front of the card and centered over the hole. The female Luer-lock™ of the membrane assembly was mounted to the male Luer-lock™ connector of the sample card and an absorbance spectrum in transmission mode was recorded through the Luer-lock™. Spectra were recorded using 100 scans (approximately 2 minutes observation time) at a resolution of 8 cm$^{-1}$. Reference spectra were recorded with membrane fully wetted with a water free oil sample. While water free reference samples were used, presence of water in a reference sample would not interfere with quantification of $Ca(OH)_2$ band at 3645 cm$^{-1}$. Experimental conditions used in Step A, provided in Table 3, were selected to provide a range of 0.12 to 1.2 absorbance units for the band at 3645 cm$^{-1}$. This converts to concentrations of water in oil from 100 to 1,000 ppm. If the band at 3645 cm$^{-1}$ was not observed or lower than 0.12 absorbance was observed after Step A, then the water level was below 100 ppm and the experiment was repeated using the experimental parameters for Step B. These parameters lead to a detection range of 10 to 100 ppm for absorbance values ranging from 0.12 to 1.2. Again, if the band at 3645 cm$^{-1}$ was below 0.12 absorbance for Step B, the water concentration was lower than 10 ppm and the experiment was repeated using the parameters for Step C to determine the concentration in the range of 1 to 10 ppm. Note that sample volumes of 4 and 40 mL were processed though the membrane to obtain detection ranges of 10 to 100 ppm and 1 to 10 ppm, respectively. A syringe pump, operating at 1 ml/min, was used to pass larger volumes through the membrane assembly. The syringe pump was orientated such that the oil passed vertically through the membrane assembly.

TABLE 3

Experimental Parameters used for Step A-D

| Step | Test range (ppm) | Vol. of sample (ml) | Amount of CaO (mg) | Reaction time (min) | Vol. (ml) passed through the membrane | Abs. at 3645 cm$^{-1}$ |
|---|---|---|---|---|---|---|
| A | 100-1000 | 5 | 155.5 | 30 | 0.4 | 0.12-1.2 |
| B | 10-100 | 5 | 15.5 | 30 | 4 | 0.12-1.2 |
| C | 1-10 | 100 | 31.1 | 30 | 40 | 0.1-1.2 |
| D | 1000-10000 | 5 | 933 | 60 | 0.04 | 0.1-1 |

If the intensity of the band at 3645 cm$^{-1}$ exceeded a value of 1.2 absorbance after Step A, then the concentration of water exceeded 1,000 ppm. To measure water concentrations between 1,000 to 10,000 ppm, the experimental parameters described for Step D were used (see Table 3). In particular, a 40 µl sample of the oil was directly deposited onto the membrane using a micropipette. The opening of the disposable micropipette tip was cut to double the size of the tip opening diameter to allow uptake of the particulate suspension. The micropipette was then inserted into a stirred beaker containing the oil sample to extract a 40 µl aliquot. The top section of the membrane assembly was removed and the 40 µl was slowly injected onto the surface of the membrane while moving the micropipette tip over the membrane surface to fully wet the membrane with a uniform distribution of CaO powder. The top section of membrane housing was then reattached to the membrane assembly, the membrane assembly attached to the sample card, and an IR spectrum recorded.

The amount of CaO added to a water in oil sample was about 10× in excess for concentrations <2000 ppm and about 6× in excess for concentrations >2000 ppm. Samples were stirred with CaO for approximately 30 minutes and 1 hour for concentrations below and above 1000 ppm, respectively, to ensure complete reaction of the CaO with the water.

For comparison, KFT of samples was measured coulometically on a Metrohm 756 KFT using HYDRANAL®—Coelomate AG as the titration reagent. A 1 ml sample of HYDRANAL® Water Standard 1% was used for calibration. Samples of known volume were extracted from the beaker using a 10 ml disposable plastic syringe or a micropipette and then injected into the titration vessel of the KFT instrument.

$Ca(OH)_2$ was quantified using the intensity (in absorbance units) of the band associated with the OH stretching mode of $Ca(OH)_2$ at 3645 cm$^{-1}$. The amount of $Ca(OH)_2$ per area of membrane (cl) is calculated according to the Beer's Law relationship:

$$cl = \frac{A_{3645}}{\epsilon} \qquad (\text{Eq. 4})$$

where E is the extinction coefficient and $A_{3645}$ is the peak absorbance value for the band at 3645 cm$^{-1}$. The extinction coefficient E of 801 cm$_2$/g for was determined from the Beer's Law relationship, using known quantities of $Ca(OH)_2$ powder pressed in KBr pellets.

The total mass of $Ca(OH)_2$ collected on the membrane ($m_{Ca(OH)_2}$) is described by:

$$m_{Ca(OH)_2} = Cl * Area \quad (Eq.\ 5)$$

where Area is the effective area of the membrane. For Steps A-C, the effective membrane diameter is 11.5 mm, because the Teflon™ O-rings used in the membrane assembly reduce the area of the membrane that the volume of oil is passed through to 1.05 cm². For Step D, the sample is deposited on the membrane without the Teflon™ O-rings; therefore, the effective area of the membrane is the full area (1.33 cm²).

The total mass of $Ca(OH)_2$ in the beaker ($m_{t\ Ca(OH)_2}$) is described by:

$$m_{tCa(OH)_2} = m_{Ca(OH)_2} * \frac{V}{V_s} \quad (Eq.\ 6)$$

where V is the volume of oil in the beaker and $V_s$ is the volume processed through the membrane.

CaO powder added to oil reacts with dissolved water and water droplets to form $Ca(OH)_2$, according to the reaction:

$$CaO_{(s)} + H_2O_{(l)} \rightarrow Ca(OH)_{2(s)} \quad (Eq.\ 7)$$

Thus, the total amount of water in the beaker ($H_2O_t$) is represented by:

$$H_2O_t = m_{tCa(OH)_2} * \frac{M_{H_2O}}{M_{Ca(OH)_2}} \quad (Eq.\ 8)$$

where $M_{H2O}$ and $M_{Ca(OH)2}$ are the molar masses of $H_2O$ and $Ca(OH)_2$, respectively. If $H_2O_t$ is measured in units of grams, concentration of water in ppm ($C_{H_2O}$ (ppm)) is represented by:

$$C_{H_2O}(ppm) = \frac{H_2O_t}{\rho * V} * 10^6 \quad (Eq.\ 9)$$

where V is the volume of oil in the beaker (ml) and ρ is the density of the oil (g/cm³). Combining Equations 4-6 and 7-8 gives the overall equation:

$$C_{H_2O}(ppm) = \left( A_{3645} * Area\ (cm^2) * \frac{M_{H_2O}}{\epsilon * M_{Ca(OH)_2} * V_s(ml) * \rho\left(\frac{g}{ml}\right)} * 10^6 \right. \quad (Eq.\ 10)$$

Note that Equation 10 is not dependent on the volume of oil in the beaker (V). Consider two beakers containing 5 and 10 mL of oil. Addition of the same mass of CaO to both beakers would result in twice the amount of $Ca(OH)_2$ produced in the 10 mL sample, compared to the 5 ml sample. However, because the concentration of $Ca(OH)_2$ in the 10 mL sample is 50% lower, extraction of the same sample volume in the syringe would result in deposition of the same amount of $Ca(OH)_2$ on the membrane.

Addition of a 10× excess of 1.5 µm particles to a 100 ppm of water in oil sample, result in complete reaction of water in the sample with CaO within 30 minutes of stirring. If larger particles are used, a longer reaction time is required, for example, reaction of CaO with a 2.2 µm particle size with water in a sample only proceeded to 60% completion in 30 minutes; however, complete reaction was observed after 1 hour of stirring. Use of CaO particles with average diameters of less than 1.5 µm, resulted in a fraction of the particles not captured by the membrane due to their small size.

Figure 8:
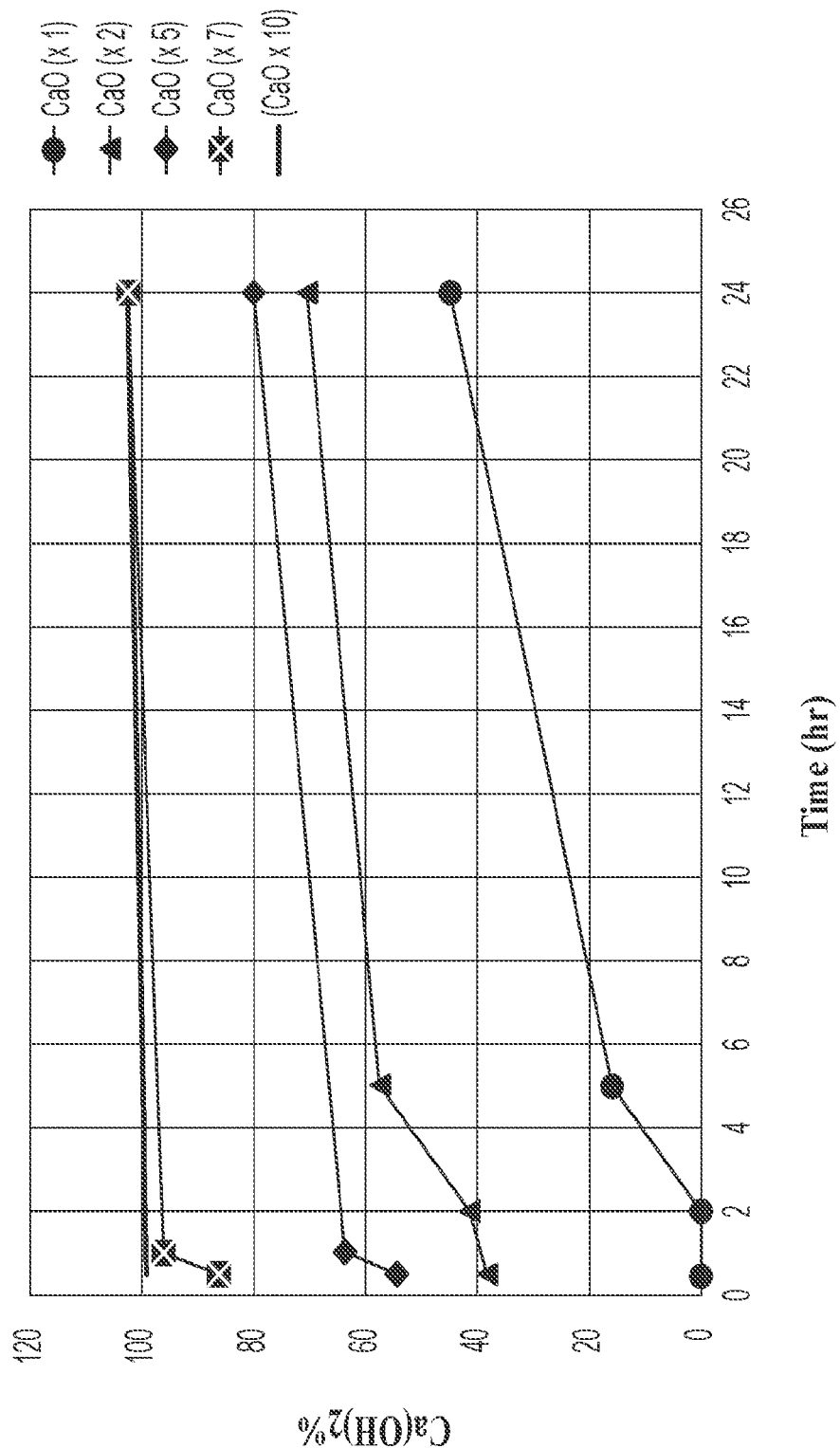
FIG. 8 is an exemplary plot depicting the consumption of water in power steering fluid samples by reaction with varying amounts of CaO over time in accordance with one or more embodiments of the present disclosure.
Figure 9:
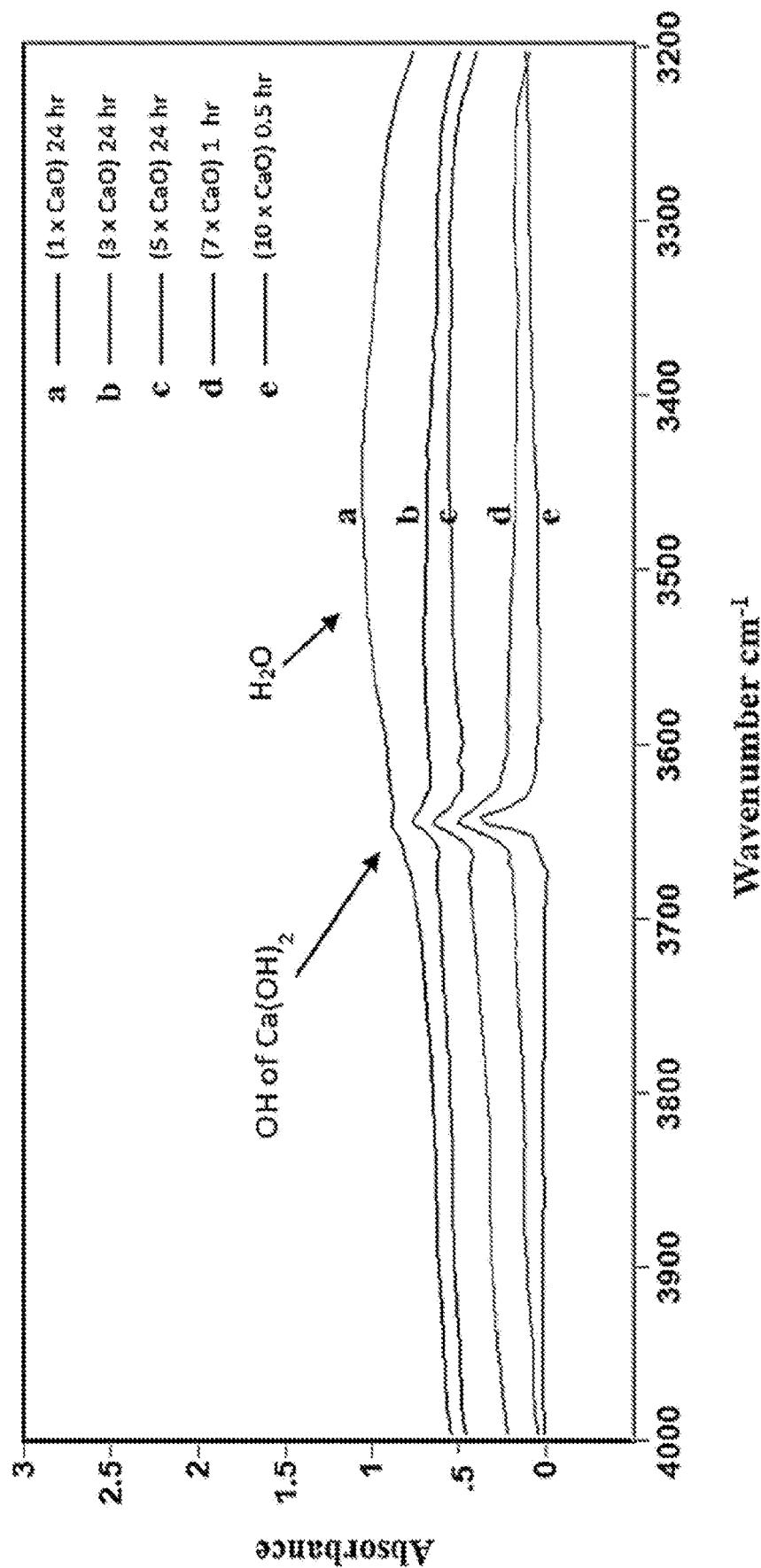
FIG. 9 is an exemplary plot of infrared spectra obtained from samples of power steering fluid samples containing 100 ppm water, where CaO was added in amounts varying from 1× to 10× in accordance with one or more embodiments of the present disclosure.

When only a 5× excess of CaO was added to an oil sample, complete reaction with water did not occur, even after 24 hours of stirring, as evidenced by the presence of both the sharp peak at 3645 cm⁻¹, corresponding to Ca (OH)₂, as well as a broad band at 3420 cm⁻¹, corresponding to water adsorbed on the membrane. When a 7× or 10× excess were used, complete consumption of water was observed in 60 and 30 minutes respectively, with no residual peak in the spectra at 3420 cm⁻¹. The rate of consumption of water relative to the excess of CaO added is depicted graphically in FIG. 8, and the IR spectra of samples tested with various amounts of CaO are depicted in FIG. 9.

Figure 10:
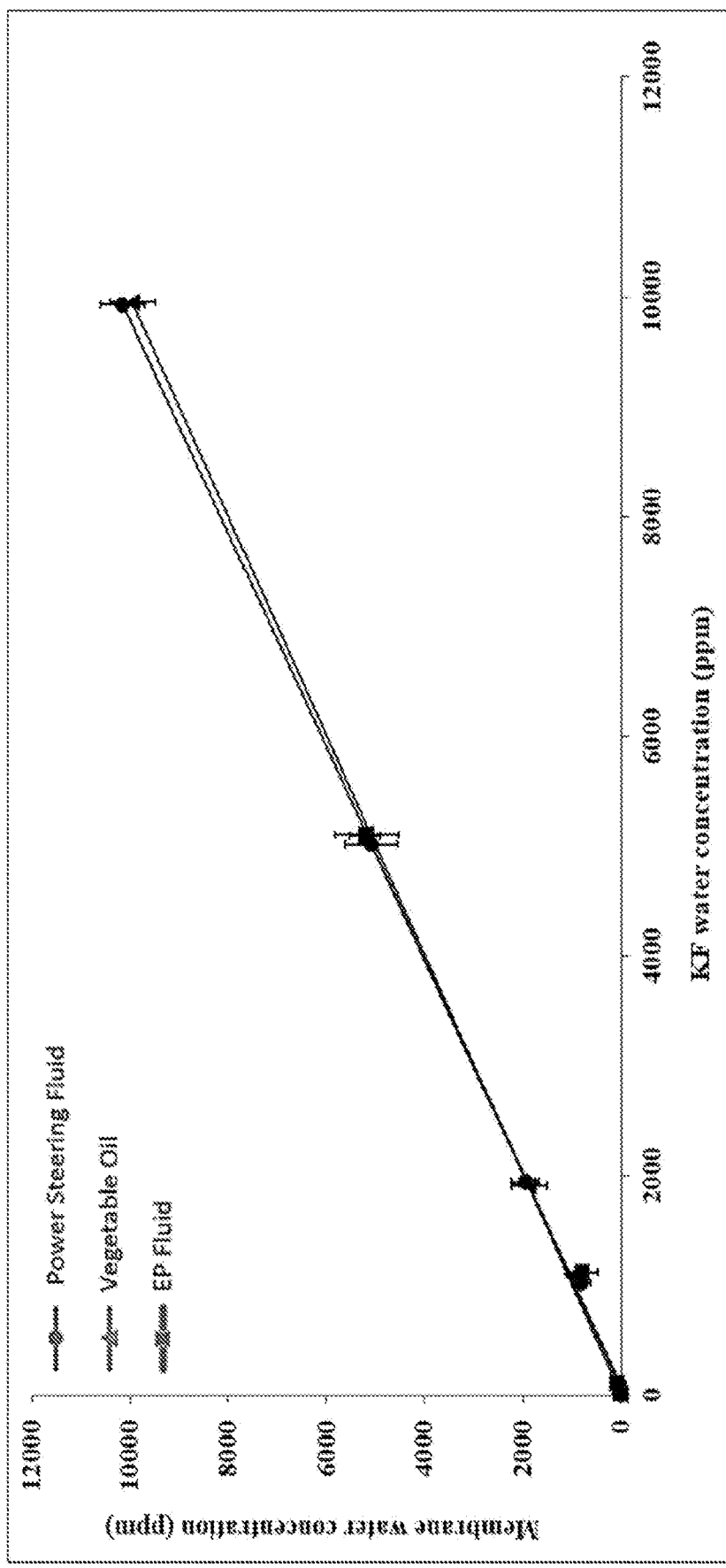
FIG. 10 is an exemplary plot comparing concentration of water in oil samples as measured by the method described in Study 2 and KFT in accordance with one or more embodiments of the present disclosure.

Concentration of water in the three types of oil samples tested were compared to values obtained by KFT (FIG. 10). Data were obtained using experimental parameters described in Table 3 and measurements were performed in triplicate. Error bars in FIG. 10 are plotted at a 95% confidence level and reflect and average % RSD of 6.7%. A statistically weighted linear regression gave slopes of 1.01±0.02, 0.99±0.01 and 1.02±0.03 (95% confidence level, 6 different concentrations) for power steering fluid, vegetable oil, and EP oil, respectively. The corresponding $R^2$ values for all three linear regressions with statistical weights was >0.996, showing exceptional linearity of detection from 1 to 10,000 ppm for power steering oil and vegetable oil and for EP fluid up to 5,000 ppm. Concentrations above 5,000 ppm of were not measured for EP fluid because the suspension became too viscous after addition of the CaO powder. Results were obtained without any calibration, as the extinction coefficient for the band at 3645 cm⁻¹ was derived using known quantities of $Ca(OH)_2$ in KBr pellets. The slopes values 1.01±0.02 and 0.99±0.01 for power steering fluid and vegetable oil and 1.02±0.03 for EP fluid demonstrate complete consumption of water by CaO and total capture of the particles by the membrane.

Study 3. Use of Copper Sulfate

The oil sample selected for Study 3 was SMB power steering fluid, distributed by SMB International, LLC West Long Branch, N.J., USA (Oil 1). Blue copper (II) sulfate pentahydrate (CaO, 99.9%) was obtained from Sigma Aldrich.

Figure 11:
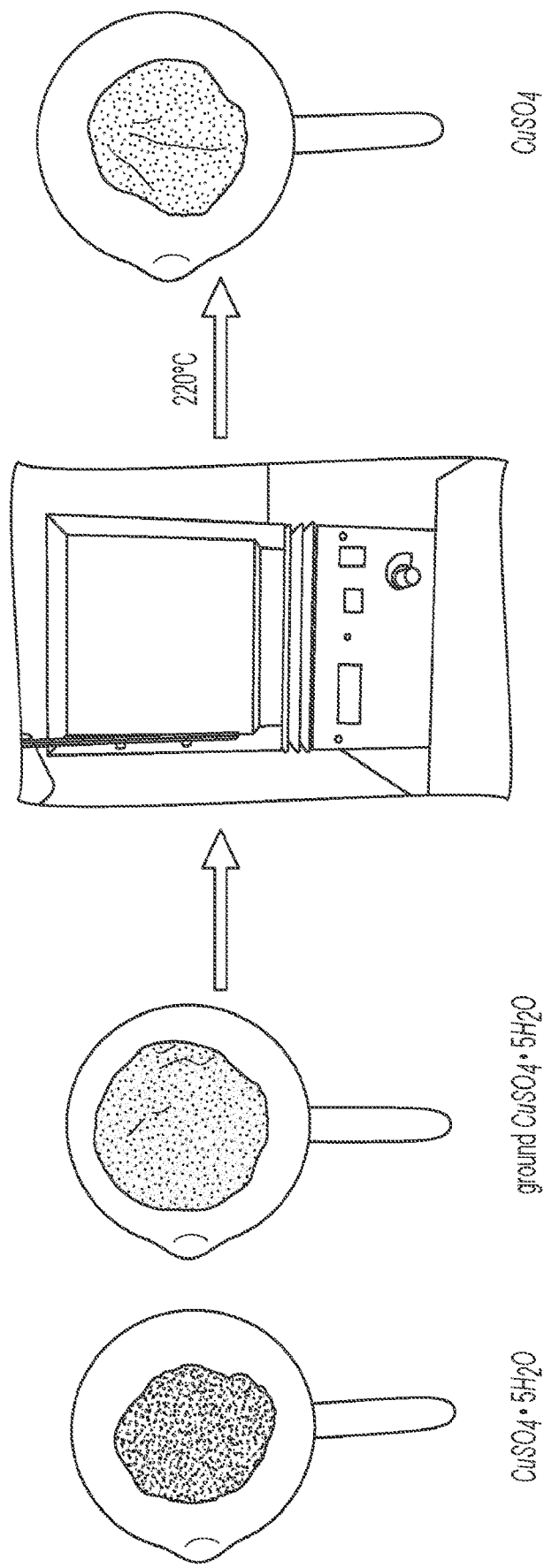
FIG. 11 is an exemplary schematic depicting a process for preparing anhydrous CuSO$_4$ in accordance with one or more embodiments of the present disclosure.

Anhydrous $CuSO_4$ was prepared by first grinding with a mortar and pestle to achieve an average diameter of approximately 0.5µm as measured by dynamic light scattering on a Malvern Zetasizer. Ground $CuSO_4$ was transferred to a covered crucible and heated in a furnace at 220° C. overnight (process depicted in FIG. 11). The sample was cooled to room temperature in a desiccator flushed with dry $N_2$ gas. Known amounts of $CuSO_4$ powder were measured and transferred to sealed vials in a glove box.

Water in oil samples at concentrations in the range of 10 to 1,000 ppm of were prepared as described in Studies 1 and 2. Comparative KFT measurements were performed as described in Studies 1 and 2.

Anhydrous $CuSO_4$ was quickly added to oil samples containing known concentrations of water. The suspension was stirred for 5-10 minutes to allow complete reaction of $CuSO_4$ with water and to obtain a homogenous suspension.

Figure 12:
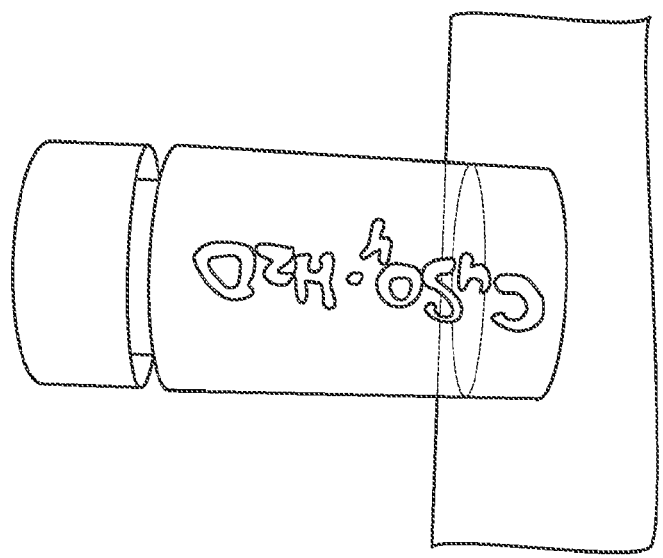
FIG. 12 is an exemplary photograph depicting a sample of power steering fluid containing reacted CuSO$_4$H$_2$O in accordance with one or more embodiments of the present disclosure.

A color change of yellow to green was observed upon formation of blue $CuSO_4 \cdot H_2O$ (FIG. 12). Experimental parameters for reaction time, amount of reagent added, and volume of sample are provided in Table 4. Samples were processed and analyzed by IR as described in Study 2.

TABLE 4

Experimental Parameters for Study 3

| Conc. (ppm) | Vol. of sample (ml) | Amount of $CuSO_4$ (mg) | Reaction time (min) | Vol. (ml) passed through the membrane | Abs. at 1743-1733 $cm^{-1}$ |
|---|---|---|---|---|---|
| 10 | 10 | 8.6 | 5-10 | 2 | 0.12 |
| 100 | 5 | 44.3 | 5-10 | 0.2 | 0.12 |
| 500 | 5 | 221.6 | 5-10 | 0.2 | 0.66 |
| 1000 | 5 | 443.3 | 5-10 | 0.2 | 1.14 |

Figure 13:
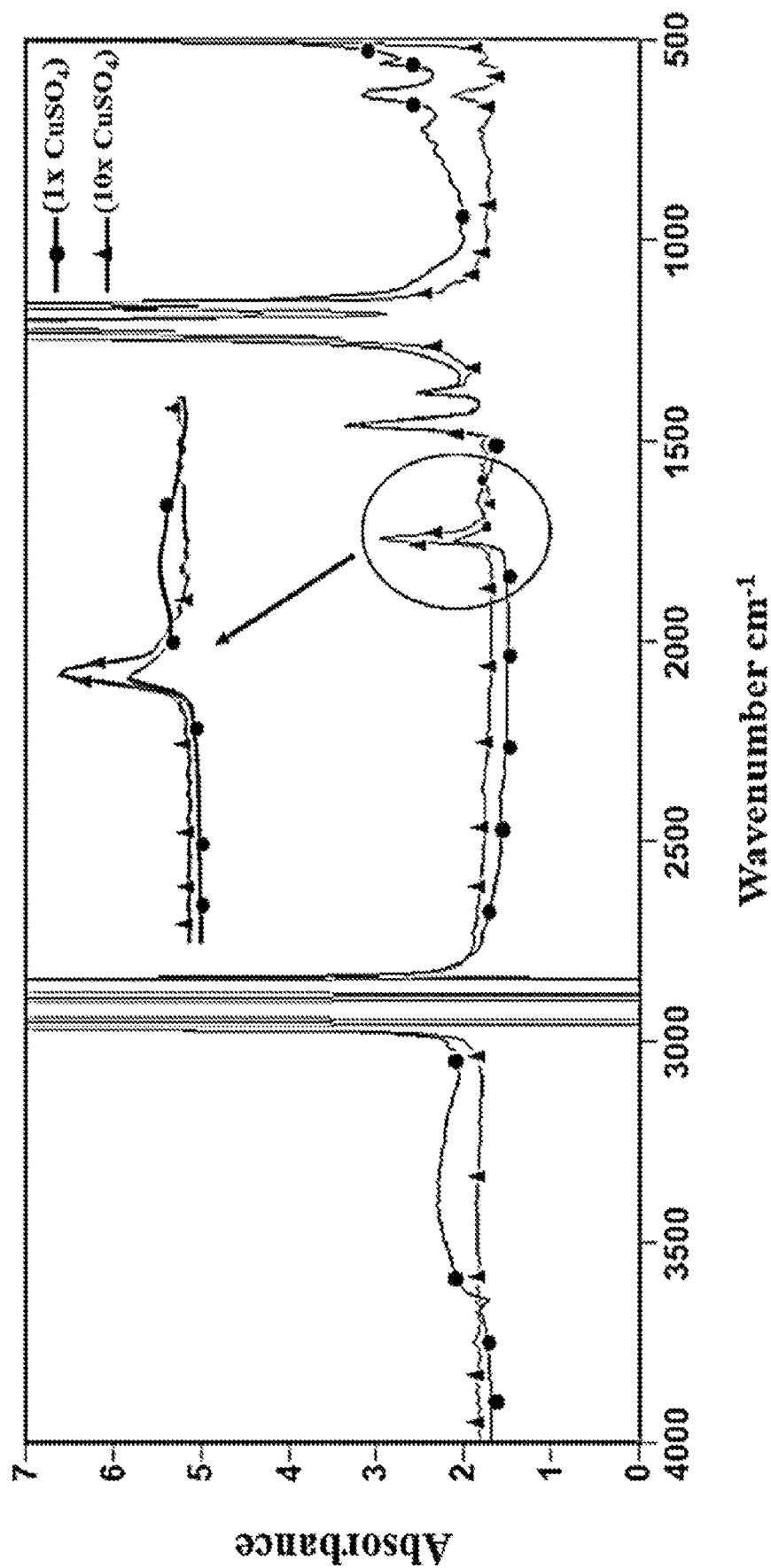
FIG. 13 is an exemplary plot of infrared spectra of power steering fluid samples processed with 1× and 10× $CuSO_4$ in accordance with one or more embodiments of the present disclosure.

Coordination of water with $CuSO_4$ produces several hydrates from the monohydrate $CuSO_4 \cdot H2O$ to the pentahydrate $CuSO_4 \cdot 5H_2O$. Bands due to the O-H stretching and bending modes of water in the IR spectra of each of these hydrates vary in wavenumber and intensity. For example, the O—H stretching mode of water in $CuSO_4 \cdot 5H_2O$ appears as a broad band at 3420 $cm^{-1}$ whereas the band has lower intensity and shifts to 3190 $cm^{-1}$ in $CuSO_4 \cdot H_2O$. Similarly, the bending mode of the water in $CuSO_4 \cdot 5H_2O$ appears at 1667 $cm^{-1}$ and shifts to 1743 $cm^{-1}$ in $CuSO_4$. $H_2O$ due to the strong coordination of a single water molecule with the $Cu^{+2}$ cation. The process described in this study results in the formation of only $CuSO_4 \cdot H_2O$ as evidenced by the spectra depicted in FIGS. 13 and 14. Without wishing to be bound by any particular theory, it is believed that the formation of only the monohydrate is due to the low concentration of water in the samples. Water binds only to the surface $CuSO_4$ of the particles, requiring addition of a 10× excess of $CuSO_4$. Infrared spectra depicted in FIG. 13 indicate that addition of a stoichiometric amount of $CuSO_4$ relative to the amount of water in a sample does not result in complete consumption of water; two bands associated with the O—H stretching and bending modes of free water are observed at 3400 and 1640 $cm^{-1}$, respectively. In contrast, after addition of 10× excess $CuSO_4$, the spectrum obtained exhibited no evidence of water extracted on the membrane (i.e. no bands occurring at 3400 and 1640 $cm^{-1}$), along with an increase in intensity of the band at 1743 $cm^{-1}$.

Figure 14:
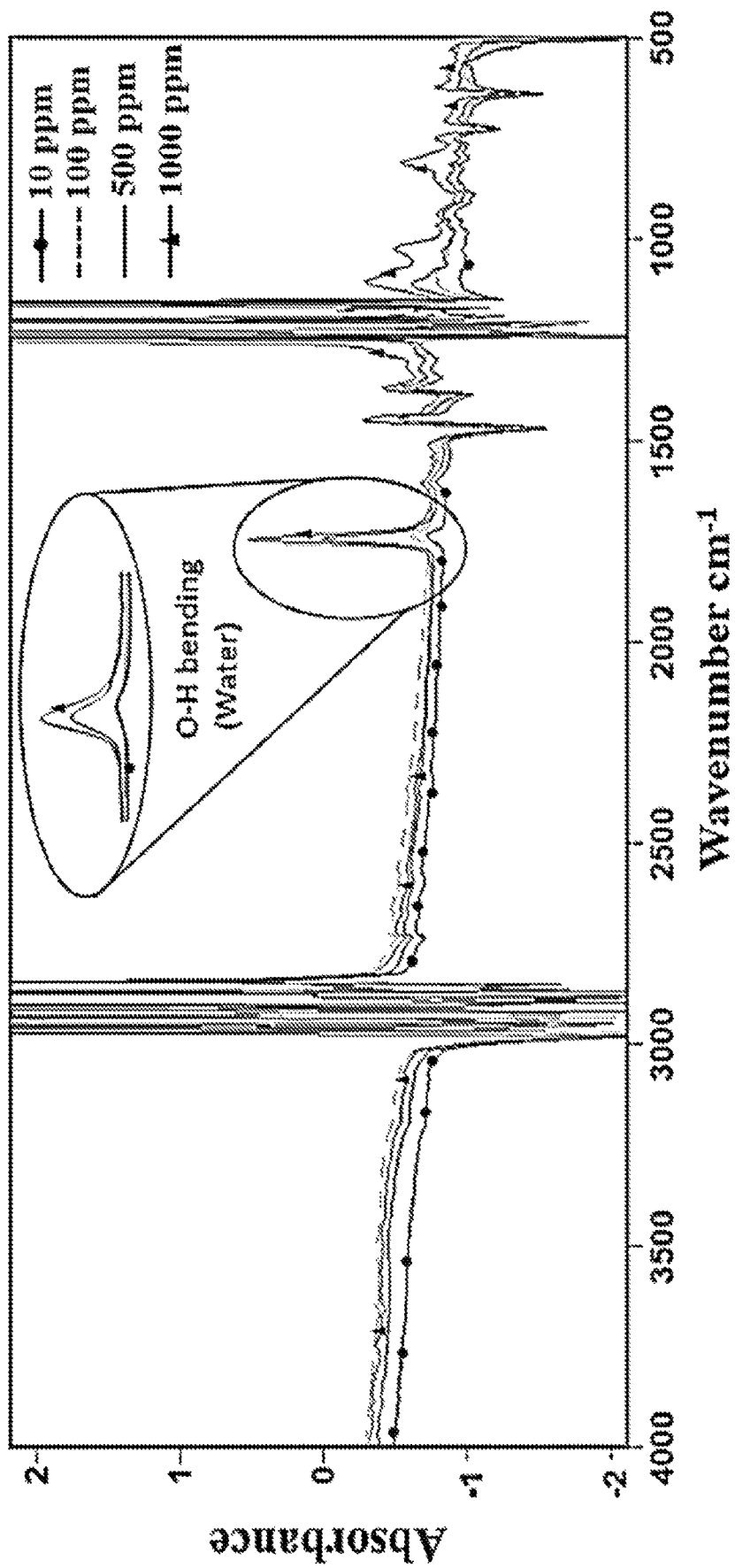
FIG. 14 is an exemplary plot of infrared spectra of power steering fluid samples with water concentrations ranging from 10 ppm to 1000 ppm processed with $CuSO_4$ in accordance with one or more embodiments of the present disclosure.

Infrared spectra depicted in FIG. 14 were obtained after adding $CuSO_4$ particles to samples containing 10, 100, 500, and 1,000 ppm of water in power steering fluid and then passing known volumes of the suspension through the membrane assembly. The regions between 3000-2800 and 1250-1130 $cm^{-1}$ are opaque due to the strong C—H modes of the oil and the strong C—F modes of the membrane, respectively. The two bands at 1446 and 1364 $cm^{-1}$ along with the bands in the 800-600 $cm^{-1}$ region are due to the C—H bending modes of the power steering fluid. The presence of positive oils bands indicates the presence of more oil in the sample spectrum than in the reference spectrum. Even though the reference spectrum is recorded though a membrane fully saturated with oil, the amount of oil probed by the beam when running the sample spectrum can vary from the reference due to slight differences in thickness of individual membranes, resulting in weak positive or negative C-H bending modes in the spectra. Bands centered at 1105, 1020 and 809 $cm^{-1}$ are attributed to asymmetric stretching ($v_3$), symmetric stretching and bending ($v_1$ and $v_2$) vibrations of the $SO_4^{-2}$ group, respectively. The presence of the $SO_4^{-2}$ bands indicates successful collection of the $CuSO_4$ particles on the membrane.

Quantification of water in oil samples for Study 3 was performed using the peak at 1743 $cm^{-1}$ attributed to the O—H bending mode of water. The intensity of this band at 1743 $cm^{-1}$ varies with concentration of water in the oil and volume of sample passed through a membrane. No bands due to the O—H stretching modes of free water near 3400 $cm^{-1}$ were observed in the spectra. When water is coordinated to the $Cu^+2$ ion in $CuSO_4$ through the oxygen atom of water, the intensity of the bending mode of water is enhanced relative to the stretching modes. The peak observed at 1743 $cm^{-1}$ in the spectra of FIG. 14 is attributed to the O—H bending vibration mode of $CuSO_4H_2O$ produced from coordination of a single water molecule to $CuSO_4$. Furthermore, strong coordination of water to $CuSO_4$ through the oxygen atom of the water molecule leads to a shift of the bending mode to 1743 $cm^{-1}$ from 1640 $cm^{-1}$ of free water.

The total mass of water captured by the membrane in Study 3 was determined by:

$$M_{H2O} = A * \pi R^2 / \epsilon \qquad \text{(Eq. 11)}$$

where $MH_2O$ is the total mass (mg) of water captured by the membrane, A is the peak absorbance value for the $H_2O$ bending mode at 1743 $cm^{-1}$, $\epsilon$ is extinction coefficient ($cm^2$/mg $H_2O$) and R (cm) is the radius of the membrane.

As in the previously described studies, the membrane diameter was 13 mm with an area of 1.33 $cm^2$. Reduction of the effective membrane diameter to 11.5 mm by the Teflon™ O-rings of the membrane assembly, reduced the effective radius to 5.75 mm and effective area to 1.05 $cm^2$. The concentration of water in the oil in units of ppm ($C_{H2O}$ (ppm)) is calculated according to:

$$C_{H2O}(ppm) = \frac{M_{H2O}(mg)}{\left\{V(ml) * \rho\left(\frac{g}{ml}\right)\right\}} * 10^9 \qquad \text{(Eq. 12)}$$

where $M_{H2O}$ is the mass of water determined from Equation 11, V is the volume of oil passed through the membrane, and $\rho$ is the density of the oil.

Figure 15:
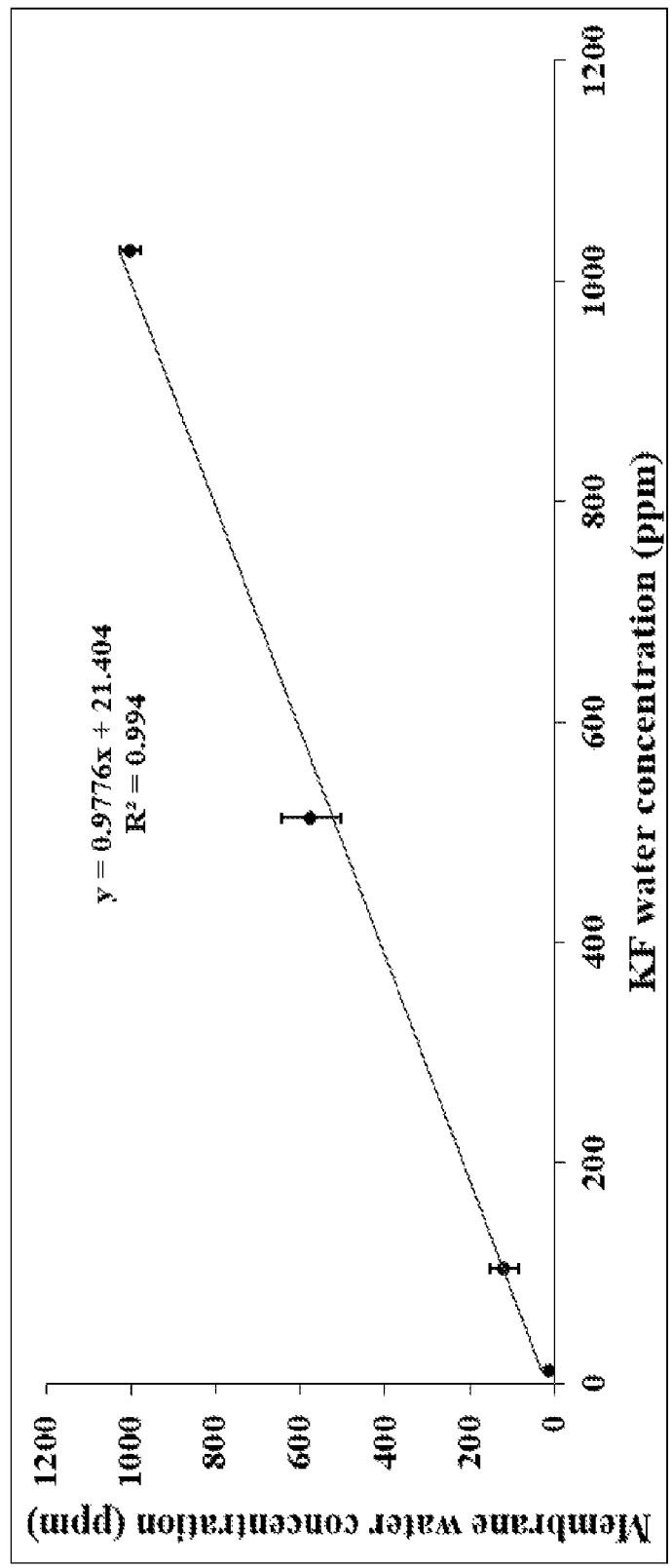
FIG. 15 is an exemplary plot comparing concentration of water in oil samples as measured by the method described in Study 3 and KFT in accordance with one or more embodiments of the present disclosure.

Extinction coefficient for the band at 1743 $cm^{-1}$ (6.01 $cm^2$/mg of $H_2O$) was determined according to Beer's Law from samples prepared with known water concentrations ranging from 10 to 1,000 ppm. With this extinction coefficient, the concentration of water in oil samples was determined via Equations 11 and 12. Concentration of water in power steering fluid samples were compared to values obtained by KFT (FIG. 15). Data were obtained using experimental parameters described in Table 4 and measurements were performed in triplicate. Error bars in FIG. 15 are plotted at a 95% confidence level and reflect an average % RSD of 7.3%. A statistically weighted linear regression gave a slope of 0.98. The corresponding $R^2$ value for the linear regression was 0.994, showing exceptional linearity of detection from 10 to 1,000 ppm.

What is claimed is:

1. A method of measuring water concentration in a sample comprising steps of:
   passing a sample through a membrane that is transparent to one or more forms of radiation in at least one region of interest;
   irradiating the membrane with the one or more forms of radiation; and determining water concentration in the sample from one or more absorbance and/or Raman peaks, wherein the membrane is cooled to a temperature between −196° C. to 10° C., inclusive.

2. The method of claim 1, wherein the one or more forms of radiation comprises microwave, infrared, visible, and/or ultraviolet light.

3. The method of claim 1, wherein the membrane is purged with a gas that is substantially free of water prior to the step of passing the sample through the membrane.

4. The method of claim 1, wherein the one or more absorbance and/or Raman peaks are characterized in that they occur at a wavelength selected from the group consisting of about 5185 cm$^{-1}$, about 3420 cm$^{-1}$, about 2127 cm$^{-1}$, about 1650 cm$^{-1}$, about 800 cm$^{-1}$ and combinations thereof.

5. The method of claim 1, wherein the water concentration in the sample is in a range of about 1 ppm to about 10,000 ppm.

6. A method of measuring water concentration in a sample comprising steps of:
adding an agent to a sample to react with and/or adsorb water from the sample, thereby forming a solid particulate material;
collecting the solid particulate material on a membrane that is transparent to one or more forms of radiation in at least one region of interest;
irradiating the membrane with the one or more forms of radiation; and
determining water concentration in the sample from one or more absorbance and/or Raman peaks,
wherein the membrane is cooled to a temperature between −196° C. to 10° C., inclusive.

7. The method of claim 6, wherein the one or more forms of radiation comprises microwave, infrared, visible, or ultraviolet light.

8. The method of claim 6, wherein the step of adding an agent to the sample comprises adding the membrane coated in the agent to the sample.

9. The method of claim 6, wherein the agent is selected from the group consisting of calcium oxide, magnesium oxide, copper sulfate, zinc oxide, sodium oxide, iron chloride, cobalt nitrate, nickel sulfate, tungsten oxide, alumina, silica, titania, calcium hydride, and combinations thereof.

10. The method of claim 9, wherein the one or more absorbance and/or Raman peaks are characterized by a wavelength in a range of about 3500 cm$^{-1}$ to about 3100 cm$^{-1}$, in a range of about 1600 cm$^{-1}$ to about 1800 cm$^{-1}$, or combinations thereof.

11. The method of claim 9, wherein the one or more absorbance and/or Raman peaks are characterized by a wavelength of about 3420 cm$^{-1}$, 3190 cm$^{-1}$, 1743 cm$^{-1}$, 1667 cm$^{-1}$, 3645 cm$^{-1}$ or combinations thereof.

12. The method of claim 6, wherein the water concentration in the sample is in a range of about 1 ppm to about 10,000 ppm.

13. The method of claim 6, wherein an amount of the agent is added such that absence of an absorbance peak at 3420 cm$^{-1}$ indicates complete consumption of water in the sample.

14. The method of claim 1, wherein the sample is an oil.

15. The method of claim 14, wherein the oil that is at least partially coating the membrane is a secondary oil.

16. The method of claim 1, wherein the membrane has a diameter of 1 to 80 mm.

17. The method of claim 1, wherein the membrane has a diameter of 10 to 50 mm.

18. A system for measuring water concentration in a sample comprising:
a membrane that is transparent to one or more forms of radiation in at least one region of interest,
an enclosure that removably retains the membrane and includes an optically transmissive region through which radiation may pass,
an inlet for the enclosure, and
a porous support for the membrane.

19. The system of claim 18, wherein the system further comprises a pump.

20. The system of claim 19, wherein the pump is capable of one or more of: creating a vacuum, and introducing a gas that is substantially free of water into and/or through at least a portion of the enclosure.

21. The system of claim 18, wherein the system further comprises a cooling means.

22. A method of measuring water concentration in a sample comprising steps of:
passing a sample through a membrane;
wherein the membrane is transparent to one or more forms of radiation in at least one region of interest, and
wherein the membrane is at least partially coated in oil;
irradiating the membrane with the one or more forms of radiation; and
determining water concentration in the sample from one or more absorbance and/or Raman peaks.

* * * * *